US007367044B2

(12) United States Patent
Fowler et al.

(10) Patent No.: US 7,367,044 B2
(45) Date of Patent: Apr. 29, 2008

(54) SYSTEM AND METHOD FOR NETWORK OPERATION

(75) Inventors: Stephan Fowler, London (GB); James Rodgers, London (GB); Colin Green, London (GB)

(73) Assignee: Clink Systems, Ltd., London (GB)

( * ) Notice: Subject to any disclaimer, the term of this patent is extended or adjusted under 35 U.S.C. 154(b) by 912 days.

(21) Appl. No.: 10/172,169

(22) Filed: Jun. 14, 2002

(65) Prior Publication Data

US 2003/0233541 A1  Dec. 18, 2003

(51) Int. Cl.
*G06F 21/00* (2006.01)
*H04M 3/42* (2006.01)
*H04Q 7/22* (2006.01)

(52) U.S. Cl. .................................. 726/1; 455/414.1
(58) Field of Classification Search .................. 726/2, 726/3, 4, 21, 26, 27, 28
See application file for complete search history.

(56) References Cited

U.S. PATENT DOCUMENTS

| | | | | |
|---|---|---|---|---|
| 4,405,829 A | | 9/1983 | Rivest et al. ............... 178/22.1 |
| 4,919,545 A | | 4/1990 | Yu ............................... 380/25 |
| 5,761,669 A | * | 6/1998 | Montague et al. ....... 707/103 R |
| 5,918,228 A | | 6/1999 | Rich et al. .................... 707/10 |
| 6,073,105 A | * | 6/2000 | Sutcliffe et al. ............... 705/1 |
| 6,134,658 A | | 10/2000 | Multerer et al. ............ 713/175 |
| 6,158,010 A | | 12/2000 | Moriconi et al. ........... 713/201 |
| 6,189,103 B1 | | 2/2001 | Nevarez et al. ............. 713/201 |
| 6,212,634 B1 | | 4/2001 | Geer, Jr. et al. ............. 713/156 |
| 6,216,231 B1 | | 4/2001 | Stubblebine ................ 713/201 |
| 6,247,026 B1 | | 6/2001 | Waldo et al. ................ 707/206 |
| 6,256,741 B1 | | 7/2001 | Stubblebine ................ 713/201 |
| 6,269,406 B1 | * | 7/2001 | Dutcher et al. ............. 709/248 |
| 6,314,409 B2 | | 11/2001 | Schneck et al. ............... 705/54 |
| 6,601,171 B1 | * | 7/2003 | Carter et al. ................ 713/175 |
| 6,658,455 B1 | * | 12/2003 | Weinman, Jr. .............. 709/203 |
| 6,758,812 B2 | * | 7/2004 | Lang .......................... 600/300 |
| 6,968,209 B1 | * | 11/2005 | Ahlgren et al. ............. 455/558 |
| 7,024,478 B1 | * | 4/2006 | Dalgic et al. ............... 709/225 |
| 7,085,257 B1 | * | 8/2006 | Karves et al. .............. 370/352 |
| 7,107,043 B2 | * | 9/2006 | Aoyama ................... 455/412.1 |
| 7,194,484 B2 | * | 3/2007 | Aoki ....................... 707/104.1 |
| 2001/0007133 A1 | | 7/2001 | Moriconi et al. ........... 713/201 |
| 2001/0025280 A1 | | 9/2001 | Mandato et al. ............... 707/3 |
| 2002/0010736 A1 | * | 1/2002 | Marques et al. ............ 709/201 |
| 2002/0049828 A1 | * | 4/2002 | Pekarek-Kostka .......... 709/217 |
| 2002/0162030 A1 | * | 10/2002 | Brezak et al. .............. 713/202 |
| 2003/0154256 A1 | * | 8/2003 | Hadano et al. ............. 709/206 |

(Continued)

*Primary Examiner*—Christopher Revak
(74) *Attorney, Agent, or Firm*—Philip G. Meyers

(57) ABSTRACT

A network of secure servers, requiring no central entity to administer user identities or access permissions. Each autonomous server hosts a set of user accounts. Users may link to and access the accounts of all other users in the network. Resources in accounts are private, but users may grant each other partial permissions to them. Links and permissions are independent of the location of accounts, and are cryptographically authenticated. Users may migrate their account between servers without loosing accumulated permissions, or breaking links that others have to their account. The ability to grant permissions may be delegated to reflect complex organizational structures. A permission may be configured to unlock data in a multitude of accounts. The system will support applications that require secure information sharing across multiple organizational boundaries, and provides a distributed security model which is feasible to deploy as it is wholly administered by its users.

9 Claims, 12 Drawing Sheets

U.S. PATENT DOCUMENTS

2003/0154405 A1* 8/2003 Harrison ............... 713/201
2006/0168231 A1* 7/2006 DiPerna ............... 709/226
2007/0129049 A1* 6/2007 Endo et al. ............... 455/403

* cited by examiner

| GRANT | | | | | | | | | * | * | * | * | * | | * | |
|---|---|---|---|---|---|---|---|---|---|---|---|---|---|---|---|---|
| RECIPIENT HOSTED HERE | 1 | 0 | 1 | 0 | 1 | 0 | 1 | 0 | 1 | 0 | 1 | 0 | 1 | 0 | 1 | 0 |
| ISSUER HOSTED HERE | 1 | 1 | 0 | 0 | 1 | 1 | 0 | 0 | 1 | 1 | 0 | 0 | 1 | 1 | 0 | 0 |
| STATUS=CONFIRMED | 1 | 1 | 1 | 1 | 0 | 0 | 0 | 0 | 1 | 1 | 1 | 1 | 0 | 0 | 0 | 0 |
| DATE CHECKED <> null | 1 | 1 | 1 | 1 | 1 | 1 | 1 | 1 | 0 | 0 | 0 | 0 | 0 | 0 | 0 | 0 |

| ACTION | | | | | | | | | | | | | | | | |
|---|---|---|---|---|---|---|---|---|---|---|---|---|---|---|---|---|
| RE-SIGNING | 1 | 1 | 0 | 0 | 0 | 0 | 0 | 0 | - | - | - | - | - | 1 | - | 0 |
| RENEWAL | 0 | 1 | 1 | 1 | 0 | 0 | 0 | 0 | - | - | - | - | - | 1 | - | 1 |
| SOUCE OF RENEWAL | - | Rec | Iss | Rec | - | - | - | - | - | - | - | - | - | Rec | - | Rec |

LEGEND
1 = TRUE
0 = FALSE
Rec = RECIPIENT
Iss = ISSUER
* = COMBINATION NOT POSSIBLE

FIG 12

SYSTEM AND METHOD FOR NETWORK OPERATION

FIELD OF THE INVENTION

This invention relates to secure networks, the management of access permissions without central authorities, and location independence of data and users.

BACKGROUND OF THE INVENTION

The world wide web has allowed information to be easily exposed to anyone worldwide. Difficulties arise when one does not want the information to be accessible to the entire Internet community. The publisher of a document cannot easily define who should or should not have access to it. Various controls are deployable to add security and restrict access to a defined group of users, yet secured systems are generally isolated from each other, representing distinct groups of users. A user identity and password on one system will generally have no meaning on another system.

Information in one secured system is generally unavailable to the users of another secured system. This is often desirable. However, there are numerous examples where the converse is a core requirement. For instance, there may exist sensitive documents that should be available to the staff of an enterprise. Typically, these documents are only accessible by users of particular system on which they reside. Staff in other divisions or territories are not recognized by that system. Even less are third parties who should also have secure access to the documents. Such situations present a distinct security problem because users and/or resources are not within the same security authority. A common solution is to create an overarching system such as an intranet that centralizes data and users. Unfortunately this is an impracticable way to represent the numerous relationships that coexist between individuals, enterprises, an other entities.

The choice of email provider is an illustrative parallel. If communicants needed to be registered with the same provider to send and receive each others' messages, the technology would be of little relative worth. A person's choice of provider is not based on the individuals they might wish to communicate with. These are in any case dispersed across a profusion of other providers.

Users also migrate between service providers and have to relinquish their previous user identity. Email fails here, as email addresses are not transferable between domains. Generally, changing one's network location implies having to re-establish the basis of electronic relationships with other users if one's network identity is the basis of security permissions.

The distributed nature of the internet presents a distinct problem with regards to the management of users' access to each others' private data. Whereas technologies such as SSL/TLS, SSH, and IPSEC effectively manage secure one-to-one communication between authenticated systems, they do not address the problem of many-to-many access permissions. There are various approaches to this particular problem in the art. Typically, they involve a central entity acting as an authority over a network. This authority either authenticates user identities or acts as an endorser of identities as worthy of 'trust'.

An example of a centralized authentication entity is the Kerberos system, (Kohl, J. and C. Neuman, "The Kerberos Network Authentication Service (V5)", RFC 1510, 1993). Whilst this approach is applicable within a single organization, there are objections to its use across larger networks. Firstly, it is antithetical to the nature of the Internet, which owes its unbounded scalability to its highly decentralized structure. A technology whose value is dependant on a monopoly of its function suffers scalability problems and is an unstable solution as a network expands. Secondly, the namespace of user identities is necessarily owned by the central entity. This is problematic if one's network identity (and thus one's ability to access resources) is ultimately controlled by an entity to which one may not be accountable, or whom one does not desire as an intermediary.

Private Key Infrastructure (PKI) is an example of a central entity that acts to endorse user identities as worthy of 'trust'. This is a useful tool for authentication, i.e. the binding of the real name or user name of an individual to a public key in a digital certificate. The endorsement of an authority is however only of value if the authority is trusted by the target system. This suggests the need for multiple authorities. The resulting burden of certificate management is unfortunately beyond the scope of most organizations or systems, particularly as PKI is a difficult model to successfully automate. Furthermore, PKI authorities endorse identities, not access rights. They cannot easily manage these rights or express them in a unified way for consumption by a diversity of target systems.

Approaches that address the problem of authentication without central authorities are Pretty Good Privacy ('OpenPGP Message Format', J. Callas, L. Donnerhacke, H. Finney, R. Thayer, RFC 2240, November 1998) and Simple Public Key Infrastructure ('SPKI Certificate Theory', C. Ellison, B. Frantz, B. Lampson, R. Rivest, B. Thomas, T. Ylonen, RFC 2693, September 1999). These approaches are compelling but administratively complex from the perspective of a user. The latter does allow the specification of authorization rights, but does not propose a single simple unified method for this. Particularly, it is important that an authorization right be understood by more than one system. Consider the case of a group of individuals who each wish to securely expose documents to each other. This should be feasible without knowledge of the nature of each others system.

If secure access rights are to be granted to a certain class of document, one would hope this permission could be specified independently of their actual location. For example, documents for consumption by senior staff should be generally classifiable as such, but not solely by virtue of their residence on a particular server. They may indeed exist in multiple locations. One should be able to relocate data to another system without affecting the permissions that other users may have to it. There exist in the art approaches to the separation of document identifiers from their locations. The Handle System ("Handle System Protocol v2.0 Specification". S. Sun, S. Reilly, L. Lannom, J. Shi, IETF Internet Draft, April 2001) provides a way of resolving a location independent document identifier into its network location. These initiatives ultimately rely on central services which are subject to the scalability issues already mentioned, and are not designed to address intra-user security issues.

When conceiving a distributed network of users and their private data, the systems in the prior art have inherent problems when faced with the combined requirements that: (1) it be a centerless network, (2) access to data may be restricted to specific users, (3) such users may be hosted anywhere else in the network, (4) user identities are not tied to their current choice of service provider, (5) access rights be specified without reference to data or user location, and (6) access rights be simple to administer by the users themselves. Therefore, an improved system and method are needed to enable effective operation within these common requirements. In particular, the present invention is a system that inherently fulfills all the foregoing requirements.

SUMMARY OF THE INVENTION

A system for supporting a distributed network of private resources according to one aspect of the invention includes a plurality of servers, suitable means permitting data communication between a user and each of the servers, a plurality of user accounts hosted on each server, a plurality of private resources stored on each server within each user account, a plurality of realm names used to classify the private resources, the realm names spanning any number of user accounts, and suitable means (typically client-server system software) for a first user account to grant a second user account hosted on any of the servers a permission to access all private resources classified by a realm name, if the realm name was created by the first user account, or optionally if the first user account had the right to grant such permission delegated to it. The means for permitting data communication may be any conventional data connection, such as the Internet, over a LAN or WAN, which may be wireless or use cables, or a direct data connection. A corresponding method for supporting a distributed network of private resources involves designating a plurality of realm names used to classify the private resources, the realm names spanning one or more user accounts, and permitting a user account to grant another user account hosted on the server a permission to access all private resources classified by a realm name, if the realm name was created by the first user account, or optionally if the first user account had the right to grant such permission delegated to it.

According to preferred embodiments of such a system, the user accounts are allocated a globally unique account identity including a globally unique number and a public key from an asymmetric cryptographic key pair. Software running on the server can generate network identities autonomously, without involvement of any naming authority and without need to compare the new network identity with a list of existing ones. A temporary association is made between an account identity and the location (e.g., URL) of the server that hosts it. These associations are communicable to the servers and verifiable by the servers, and user accounts may migrate between the servers without relinquishing their account identity. Permissions to access private resources are specified regardless of which server currently hosts the user accounts of the issuer and recipient of the permission. The permission enables access to all the private resources classified by the realm name specified in the permission, irrespective of which user account uses the realm name to classify the private resources.

A preferred configuration for supporting such a distributed network of private resources according to the invention includes a plurality of server software applications running on a plurality of first computers functioning as servers, a plurality of client software applications running on a plurality of second computers functioning as clients, which may be the same as or different from the first computers, and suitable means permitting data communication between client software applications and each of the server software applications. The client software applications can be used by users to establish sessions to send and receive data from server software applications.

The invention further provides a system for supporting a distributed network of private resources including a plurality of servers, means permitting data communication between a user and each of the servers, a plurality of user accounts hosted on each server, and means for automatically generating for each user an account identifier that is globally unique in the network, which means constructs the globally unique account identifier without reference to existing global account identifiers already in use on the network. The account identifier preferably comprises a globally unique number and a public key from an asymmetric cryptographic key pair. A corresponding method for maintaining user accounts in a network comprises automatically generating for each user an account identifier that is globally unique in the network by constructing the globally unique account identifier without reference to existing global identifiers already in use on the network. Each account identifier is associated with a location on one of the servers, and can be transferred from one server to another while maintaining the same globally unique account identifier.

In another aspect, the invention is applied to a system for maintaining user contact information. Such a system includes at least one server, means permitting data communication between the server and a number of electronic devices that maintain or use contact information, each device being enabled with the necessary client functionality, and a plurality of user accounts hosted on the server, each account containing a listing of current contact information for the associated user, and a contact list of identifiers for selected other users having accounts hosted on the server. In a preferred embodiment, a first user account may grant a second user account permission to access that user's contact information; otherwise such access is not permitted. The user-controlled electronic devices may be portable telephones, personal computers (desktop or hand held) or the like. A corresponding method for maintaining user contact information includes the steps of maintaining for each user account a listing of current contact information for the associated user, and maintaining a contact list of identifiers for selected other users having accounts hosted on any of the servers, which contact list can be accessed by the electronic device used by that user. These and other aspects of the invention are discussed in the detailed description that follows.

BRIEF DESCRIPTION OF THE DRAWINGS

FIG. 12 illustrates in tabular form the maintenance actions that are applied to the various grants types.

DETAILED DESCRIPTION

The present invention contemplates a network which has no center. It is a server system which can be duplicated in an any number of locations. Adding another server requires no authorization from any central administrative entity. Each service provider is therefore administratively autonomous. Users identities are created locally by servers, yet are globally unique and consistent with those on all other servers. All user identities are therefore recognizable by all servers. Users may migrate to another server without having to relinquish their existing identity.

All data placed by a user on a server is private by default. Users may securely expose a subset of this data to specific other users. It may also be generally exposed to any user who has permission to a certain class of data. Access rights may be granted to any user in the network, not just those registered on the same server. The ability to grant the right may itself be delegated, to reflect more complex organizational structures. Permissions given to users grant them access to a particular realm of data. This realm may be used to classify data in any number of locations. The access right is therefore independent of the actual location of data.

The present invention is capable of supporting applications that require secure information sharing across organizational boundaries. Three examples follow. Firstly, contact management systems that pull private contact information from other users irrespective of their network location, negating the need to maintain data about other users since the data is maintained by at source by the users themselves. Secondly, secure file sharing applications allowing file exchange across multiple organizations, negating the need to unify those organizations' secure file systems. Thirdly, secure messaging systems that allow users to deposit authenticated messages in each others accounts.

The invention is aimed at processes that depend on controlled access to distributed data. It proposes a distributed security model which is wholly administered by its users, with no dependency on central entities or third party authorities. Further objects and advantages will become evident from consideration of the detailed description and drawings. The invention is further aimed at a network of secure peer servers, requiring no central entity to administer user identities or access permissions between users.

Figure 1:
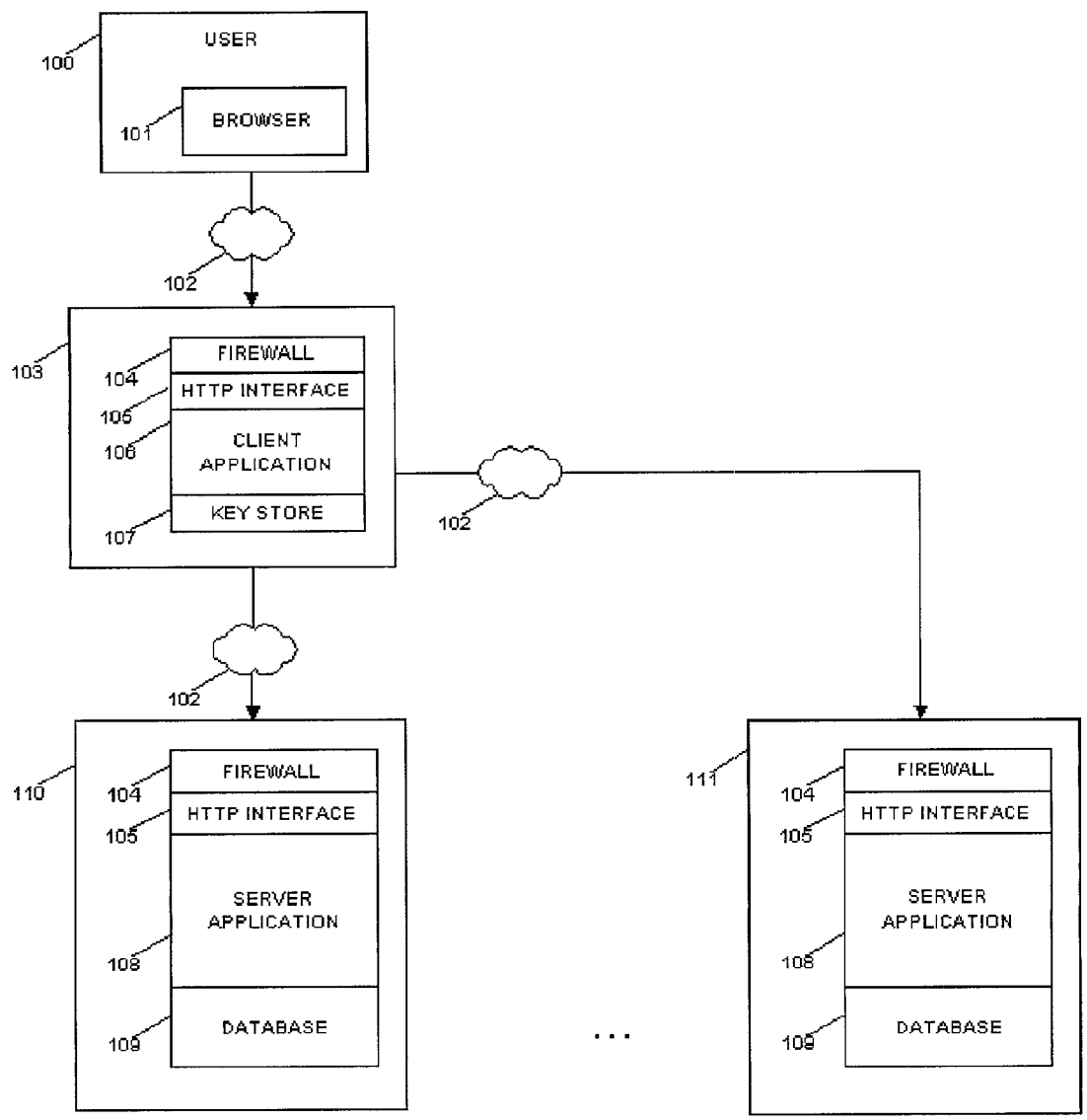
FIG. 1 illustrates in block diagram form the architecture of the components of the system of the present invention and the environment in which it operates.

The system of the present invention can be implemented by a distributed plurality of computing devices as illustrated in FIG. 1. Each server hosts a plurality of user accounts, and serves private files from those accounts. Clients act on behalf of users to request resources from servers. This may be specified differently in an alternative embodiment, for instance as a composite entity that serves both roles. For purposes of the present invention, "resources" include files saved on a server, data contained within such files, application objects, network services, dynamic content, and any other form of data, information or software code that can be made available on a server for other users to access. A plurality of isolated servers exist in an arbitrary number. Only two servers 110 and 111 are shown in FIG. 1, but the number of supportable servers is unlimited. These are peers, i.e. there is no hierarchy across servers and there are no central components in the network. Each server comprises a firewall 104, a Hyper Text Transfer Protocol (HTTP) interface 105, the server application software 108, and a database 109.

A client 103 can invoke methods on any server in the network. A client is however specially associated with a particular server, by virtue of having a 'gateway' account on it. This allows the client to create user accounts on the server. Each client comprises a firewall 104, a HTTP interface 105, the client application software 106, and an optional key store 107. Users interact with servers via client 103. Users have an account on single server. FIG. 1 shows a single user 100, although numerous users may exist with accounts distributed across a multitude of servers. Users access their account via the client associated with the server that hosts it. Typically the client holds cryptographic keys in key store 107. These keys allow the user to login to their account. Users invoke a client via an intermediary device, for example a web browser 101 run on a local PC or a dedicated agent application with a graphical user interface.

In this preferred embodiment, the system comprises distinct server and client components. Each such component includes both a physical machine (computer) and software running on that machine that provides the client or server functionality. However, as persons skilled in the art will recognize, client and server programs could be run on the same machine, which would effectively act as both client and server. It is even possible in simplified forms of the invention to provide client functionality at the user level (e.g., on the personal computer used to communicate with the network). There would not necessarily have to be a separate client software application acting as a intermediary between user and server, and server software could be designed to exchange data peer to peer with other servers, rather than by means of the described client software application. However, the client-server architecture described herein is highly efficient and functional.

The system methods described herein are invoked by clients on servers, across a network connection indicated in FIG. 1 by the Internet 102. In the preferred embodiment, these are conducted as remote procedure calls using Simple Object Access Protocol (SOAP), carried over HTTP. Other method invocation processes may be employed in alternative embodiments of the system. As HTTP protocol is inherently stateless, the servers have a method to create and manage the state of client sessions. All methods are thus parameterized by a session identifier. These methods are all synchronous.

All network traffic between clients and servers is carried out using the Secure Sockets Layer protocol (The SSL Protocol Version 3.0, Freier, Karlton, Kocher, Nov. 18, 1996). This is used for packet encryption only, to prevent against eavesdropping on network traffic. The authentication mechanism of SSL is not used. It is therefore not necessary that certificates be used to authenticate either party's public keys. All the authentication requirements are implemented at a higher level by the system itself.

Each user of the system has an account on a single server. An account provides the user with a proprietary file store. The user is allocated a cryptographic key pair, stored on the server. The user is expected to have access to a copy of the keys to authenticate themselves as the owner of their account, in order to login to it. The process of key allocation is described in the New Accounts section.

There are numerous possible approaches to structuring the file store in a user account. In the preferred embodiment, it is structured as a tree of 'folders' managed by a relational database. Each folder may contain a single arbitrarily sized binary file. It may also refer to a single other folder as its 'parent'. Multiple 'sibling' folders may have the same parent. This ensures a well formed tree representation in which each folder is identified by an unambiguous path of ancestor folders. Each folder record has the following attributes or fields:

1. Folder Identifier, unique to the database
2. Parent, a reference to the folder identifier of the parent folder
3. Folder Name, unique across its siblings,
4. MIME-type of the binary data field
5. Descriptive name
6. Alias account, a reference to another account.
7. Alias folder, a reference to a folder identifier in the other account.
8. Binary Data The fields 1 through 7 are referred to collectively as the 'header' of the folder. A folder is either referenced by its folder identifier, or by a sequence of folder names forming a path to the folder.

The network consists solely of a plurality of peer servers, so no central entity is available to provide a uniform naming service. A server itself is therefore responsible for creating identifiers for the accounts that it hosts. Because all accounts on all servers are equally addressable by all clients, it is crucial that these identifiers be a) unique across all servers, and b) resistant to impersonation by malevolent agents. The approach is to define a secure globally unique identifier, or 'SecureGUID'. This is a composite of the following two components:

1. A 128 bit UUID (Universally Unique IDentifier), defined in ISO/IEC 11578:1996, 'Information technology—Open Systems Interconnection—Remote Procedure Call (RPC)'. Particularly, the preferred algorithm for constructing these identifiers contains the following items:

a) a 48-bit hardware serial number of the network card on the computer running the server (generally referred to as the IEEE or MAC address). This is unique to each network card.

b) a 60-bit a time stamp represented by Coordinated Universal Time (UTC) as a count of 100 nanosecond intervals since 15 October 1582.

c) a 14-bit sequence number, incremented if the system clock has been tampered with or the network card has been exchanged since the last UUID was generated.

The sequence number protects against the possibility of identical UUIDs subsequent to either of these events. This is initialized with a random number, and reinitialized if its current state is ever lost. The remaining 6 bits of the UUID are reserved for version information.

2. The public key from the account's asymmetric cryptographic key pair. The particular choice of cryptographic algorithm is not specified. It must however be chosen such that it is computationally infeasible to any reasonable degree to determine a private key given its associated public key.

It is axiomatic that SecureGUIDs do not themselves directly act as network locators, in the in the manner that email addresses or web URL's do. This allows accounts and their data to migrate between servers without needing to relinquish their SecureGUID. Notably, the hardware serial number of the network card is not used to relate the account to a server, despite being a constituent of the UUID in a SecureGUID. The SecureGUID may have been generated by a server from which the account has since migrated. The method for expressing location information for accounts is covered in the resolvers section.

Under normal operation of the system, the event that two SecureGUIDs share either the same UUID or the same public key has realistically zero probability. This eventuality is not problematic if both items are not identical, as the accounts would be considered as having distinct identities. Both being identical would result in a collision of account identities, yet the probability of this is also realistically zero under normal operation of the system. A software hacker that acquires both the SecureGUID and private keys of an account may be in a position to construct a bogus account that effectively duplicates and impersonates it. This is the case with any security model that relies on the secrecy of a key, including both asymmetric and symmetric key based systems. The ability to keep the private key secret is therefore assumed.

Accounts additionally have a short name, typically selected by the user, which is only unique across accounts hosted on a particular server. This name may need to be changed if the account is migrated to another server that already has an account using the same name. The name is a human readable index to the account's SecureGUID, and is never used outside of the namespace of the particular server. A user may inform another user of their account identity and its current location by quoting their account name and server URL, much like an email address. The account name and server URL combination is strictly treated as an ephemeral identifier, useful only by virtue of its human readability and easy distribution. Unlike a SecureGUID, it does not survive the migration of the account nor embody its cryptographic identity. Clients perform one-off translations of these name/URL combinations into SecureGUIDs, as described in the pulling a resolver from an account name section below.

The login process permits a user, via a client, to establish a session with a target account on a target server. The identity that a user presents is the SecureGUID of their own account. The resulting session may allow the user to retrieve and manage files contained in the target account. There are two types of session that result from the login process:

1. 'Owner session'. This is the case where the user logs into their own account, i.e. the presented user identity is identical to the SecureGUID of the target account. The user is considered to own the target account, and the session allows them full access to all folders within the target account's folder tree.

2. 'Guest session'. This is the case where the user logs into another user's account, i.e. the presented user identity differs to the SecureGUID of the target account. The session allows restricted access rights to folders within the target account's folder tree. These restrictions are a function of permission certificates that have been granted to the user, and which the user will be required to present.

To successfully complete the process, the client must prove to the server hosting the target account that it currently has the private key associated with the user's SecureGUID. In the typical case, the client stores the key on behalf of the user in key store 107 of FIG. 1. Alternatively, users may wish to store private keys themselves, for instance on a portable medium such as a smart card. In the latter case, they would temporarily introduce the private key to the client prior to the session, and remove it after terminating the session.

Figure 2:
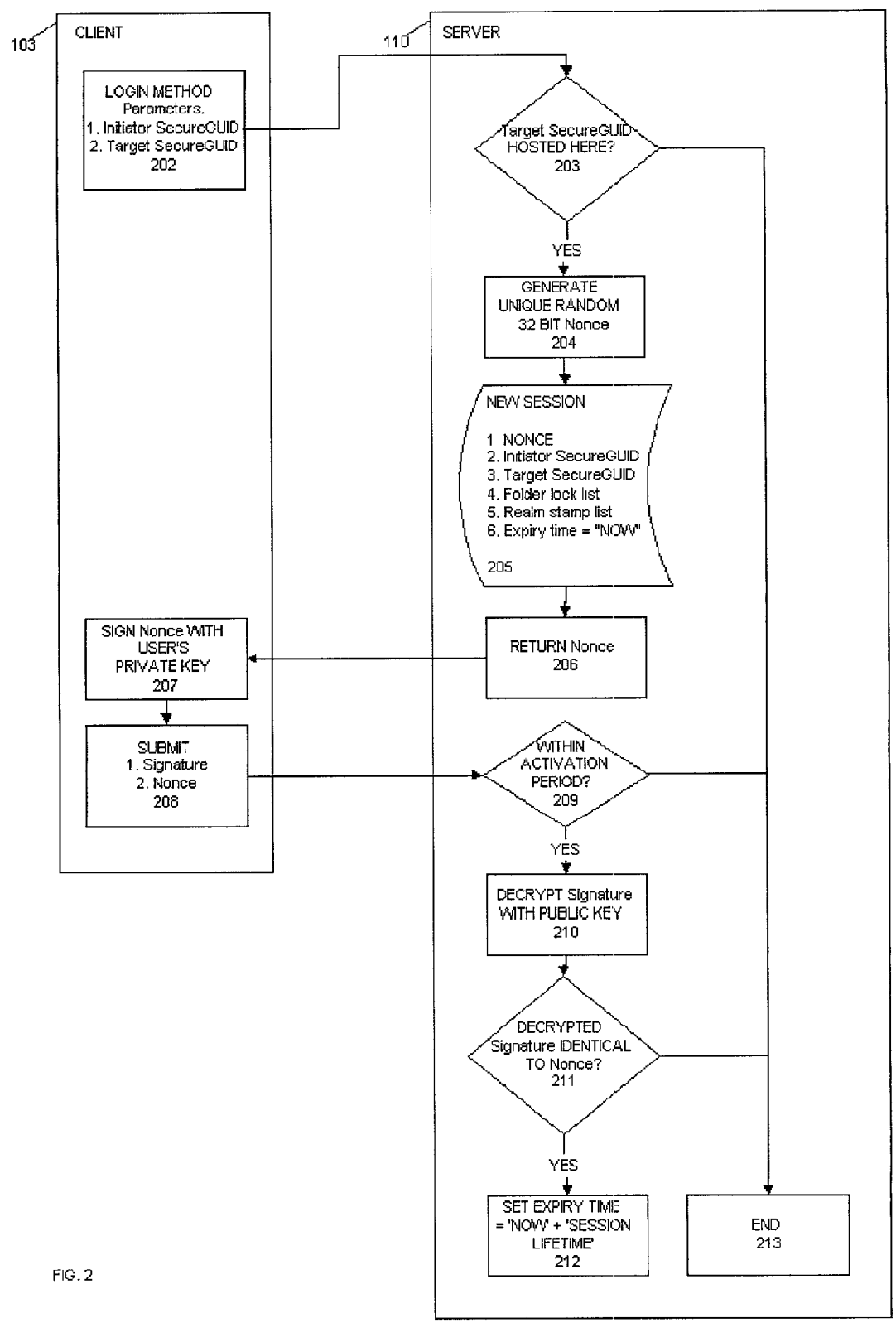
FIG. 2 illustrates in flow diagram form the operational steps of the login process which established a session with a server.

The process is illustrated in FIG. 2. In step 202, a client 103 submits the session initiator's account SecureGUID and a target account's SecureGUID to a server 110. Step 203 checks that an account with the target SecureGUID is hosted on the server 110. If so, a locally unique 32-bit random number or 'nonce' is generated in step 204. This nonce uniquely indexes a newly created session. The state of this session is created in step 205 and stored in database of sessions. Each session contains the following fields:
1. Nonce
2. Initiator SecureGUID
3. Target SecureGUID
4. Folder lock list
5. Realm stamp list
6. Expiry time The expiry time field is initialized in step 205 to the current clock time of the computer operating the server 100. This implies that the session is inactive, i.e. it has expired at the moment of creation. In step 206, the nonce is returned by server 110 to client 103.

Client 103 must now activate the session by authenticating the users identity. It digitally signs the nonce using the user's private key in step 207. This signature is returned to the server 110 in step 208, parameterized by the nonce itself. In step 209, the session state record indexed by the nonce is retrieved. A check is made that the current time is earlier than the sum of the session's expiry time and a maximum activation period. This period is determined in a configuration file on the server 110.

The public key is extracted from the Initiator SecureGUID field and used to decrypt the submitted signature in step 210. The decrypted signature is compared to the nonce itself in step 211. If these are identical, the user is considered to be authentic, insofar as the client 103 has proved that it has access to the private key of the user's account. In step 212, the expiry time in the session state is set to a fixed period ahead of the current time. This period determines the session's initial lifetime, and is specified in a configuration file on the server 110. A session that has been activated allows methods to be invoked on the target account. All such methods must in each instance be parameterized by the session's nonce.

The session nonce is only valid within the session's expiry time. The expiry time indexed by a session nonce is compared to the current system clock time for each method call received by a server. An expiry time is in the past will result in the method failing. An expired session state record is however not immediately erased. It may be reactivated within a period specified in a configuration file on the server.

The expiry process provides a safeguard in the unlikely event that a malevolent party can both break the temporary SSL encryption key and guess or eavesdrop the 32-bit nonce of an active session. In this event their window of opportunity would be limited to the session's expiry time, as the account private key is required to activate the session beyond that period. The purpose of reactivation is to maintain folder locks and realm stamps that the user may have been granted during the session. Theses are detailed later in this description.

Figure 3:
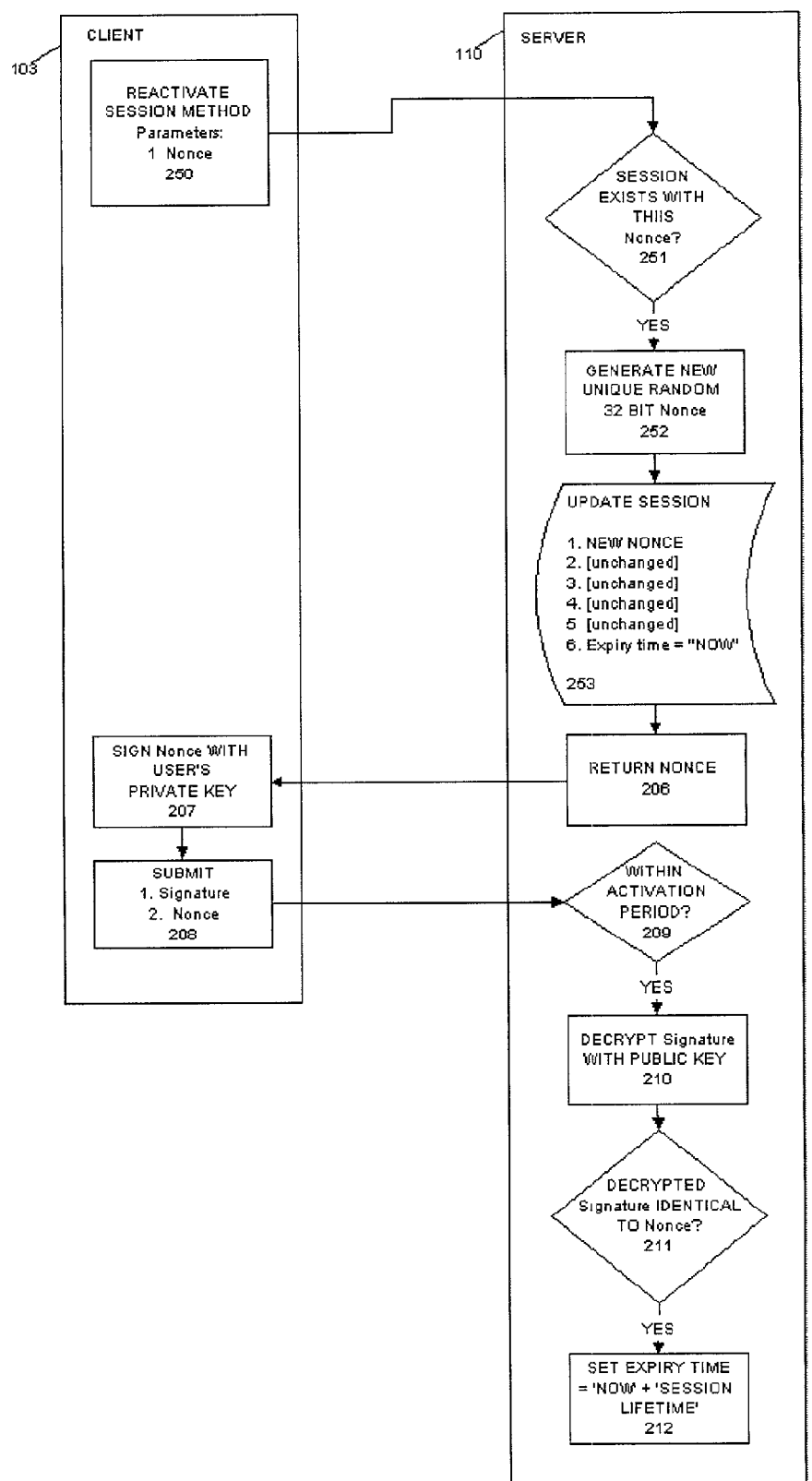
FIG. 3 illustrates in flow diagram form the operational steps of the session reactivation process.

FIG. 3 illustrates the process of session reactivation. In step 250 the client 103 submits the expired nonce to the server 110. The server 110 checks that a session exists with this nonce in step 251. If so, in step 252 a new locally unique 32-bit nonce is generated. In step 253 the existing expired session is re-indexed with this number and the expiry time is set to the current clock time. Step 206 to 212 are identical to those in FIG. 2. Note that client 103 must have remained in possession of the user's private key to complete the session renewal process.

A client may store the private keys of users in a key store 107 of FIG. 1. A user is in this case necessarily trusting the client to not use the keys without the their own consent. The client has the responsibility for authenticating users prior to retrieving their private key and logging in on their behalf The client may implement a variety of approaches to achieve this, for instance username and password or other third party authentication.

A client is associated with a particular server by virtue of having a 'gateway' account. A gateway account has the attribute of allowing the account owner (i.e. the client) to create user accounts. The client itself holds the private key for its this account, and authenticates itself to the server using the login process. The method call to create a new account on a server will only succeed if parameterized by a nonce that indexes an active owner session for a gateway account. The method returns a SecureGUID and an encrypted private key for a new account, such encryption carried out using the public key of the session initiator (i.e. the client). On receipt, the client decrypts the new account's private key using its own private key. If the client has a key store, it uses it to persist the new account SecureGUID and private key, indexed by the appropriate credential. If not, it returns these to the user. Typically, a pool of unallocated SecureGUIDs and private keys is installed on the server, which become allocated by the new account method. This reduces the computational burden of generating asymmetric key pairs on demand.

The following methods allow the user to browser and edit their folder tree and the data contained within folders. Each method is parameterized by a session nonce and either a folder identifier or a folder path:
Read header—returns all attributes of the folder, excluding the data field.
Read data—returns the data field of the folder
Read children—returns the attributes of all children of the folder, excluding their data fields
Write header—writes the folder's attributes, excluding the data field.
Write data—writes the folder's data field.
Remove folder—deletes the entire folder and all its child folders
Remove data—deletes folder's data field If the nonce that parameterizes a folder method indexes an owner session, the method will unambiguously succeed (if correctly specified). If it indexes a guest session, the method will succeed only under certain conditions. These conditions are described in the realms and guest sessions sections below.

The read header method can request a 'folder lock'. The requested lock is specified either as a 'write lock' or as a 'tree lock'. A write lock is requested if the user intends to edit and rewrite a folder to the same location. A tree lock is requested if the user intends to move or delete the folder, and by implication its descendants. A write lock is granted on a folder if there is no other write lock on it, nor tree locks on it or on its ancestors. A tree lock is granted on a folder if there are no write locks on it or its descendants, nor tree locks on its ancestors, on it, or on its descendants.

In addition to these criteria, one of two conditions must be true. The first is that the method is parameterized by a nonce that indexes an owner session. The second is that the method is parameterized by a nonce that indexes a guest session, and that the session has a 'realm stamp' for a 'read/write' permission to the 'realm' that the specified folder is in. A lock is implemented by associating the folder with the session nonce of the user that has been granted the lock. The user may explicitly release the lock using a separate dedicated method. Otherwise, the lock expires by default when the user's session state record is garbage collected from the sessions database. This takes place when the session has remained inactive beyond the reactivation period.

Users need to be able to communicate their accounts' SecureGUIDs and host server locations to each other, so that they may interact with each others' accounts. Account location information is crucial to the operation clients, so that they may invoke methods relating to those accounts on the correct target servers. The system uses a 'resolver' data structure to associate accounts with their locations. A resolver expresses location information for a specified account. Location in this context means association with another entity. Resolvers generically bind a 'child' to a 'parent'. Resolvers relating to any account may be pulled from and/or pushed to any server, by any client.

Resolvers consist of the following fields, the use of which is contingent on whether the resolver relates to a user account or a gateway account:
1. Child
2. Parent
3. Challenge token (optional)
4. Signature (optional)
5. Signature algorithm (optional)

If the resolver relates to a user account, the child field is the SecureGUID of the user account, and the parent field is the SecureGUID of its associated gateway account. The resolver is thus a statement that the specified user account is located on the same server as the specified gateway account. If the resolver relates to a gateway account, the child field is the SecureGUID of the gateway account, and the parent field is the URL of the server hosting the gateway account. The resolver is thus a statement that the specified gateway account is located on a server with the specified URL.

In the case of user accounts, two resolvers are therefore required to map an account SecureGUID to the URL of its host servers. The first associates the account to a gateway account, and the second associates the gateway account to a server URL. These two levels of indirection allows a single resolver to communicate that a server has changed URL or an entire collections of user accounts has migrated between servers. Resolvers for user accounts are always bundled with the resolver for their associated gateway account.

An 'unsigned resolver' is only populated with the child and parent fields. Such a resolver is considered 'unconfirmed' by its recipient. It is a means for a server to provide suggested location information for the specified account, if it does not host the account but has itself previously stored a resolver for it. A 'signed resolver' is one that additionally contains the challenge token, signature and signature algorithm fields. Such a resolver is considered 'confirmed' by its recipient, according to criteria described in the push resolver method section below. It is a means for a server to provide definitive information on the current location of the specified account, if it hosts that account. The challenge token is a number provided by the requester of the locator. The signature field is a digital signature created with the private key of the account refereed to in the child field.

Each resolver is stored as a single record in a resolvers database on a server. A server may store multiple resolvers for a given account if they differ in their parent field. Each record has a flag in the database indicating its status. The possible values of this flag are 'unconfirmed' and 'confirmed'. Strictly one resolver per account may be flagged as 'confirmed'. The remainder are flagged as 'unconfirmed'. Only 'confirmed' resolvers are used by the system as account locators.

If a resolver received by the push resolver method is signed and contains a challenge token identical to the current session nonce, it is considered to be a confirmation of the account location. It proves the source server's possession of account private keys and must necessarily have been created within the lifetime of the current session. Such a resolver is flagged as 'confirmed'. All previous resolvers for the same account are switched to 'unconfirmed'. Additionally, each record has a 'date checked' field. This is initially null.

Using this method, a resolver for any account may be requested by any client from any server. If the account is a user account, a resolver for its associated gateway account is bundled in the response. The process need not take place within a session, i.e. the method is not parameterized by a session nonce. The server's response is contingent on one of three outcomes:
1. The requested account is hosted on the server.
2. The requested account is not hosted on the server, but the server has a previously stored resolver for the account.
3. The requested account is not hosted on the server, and the server has no knowledge of the account.

In the first case, where the account is hosted on the server, the method returns a signed resolver for the account. Amongst servers, the hosting server uniquely has access to the private key of the account (and its associated gateway account if it is a user account). It establishes its status as the hosting server by using this key to sign resolvers for that account. To prove that it has the key at the very moment the resolver is requested, it includes in the signature a challenge token which is supplied by the client invoking the method. In the second case, the server has knowledge of the location of the account, but it is not its host. It returns the resolver, but makes no attempt to sign it (it does not have the private key that would be required for signing). The client will subsequently repeat the pull resolver method, this time invoked on the server implied by the URL in the unsigned resolver. In the third case, the server has no information which it can return to the client.

Figure 4:
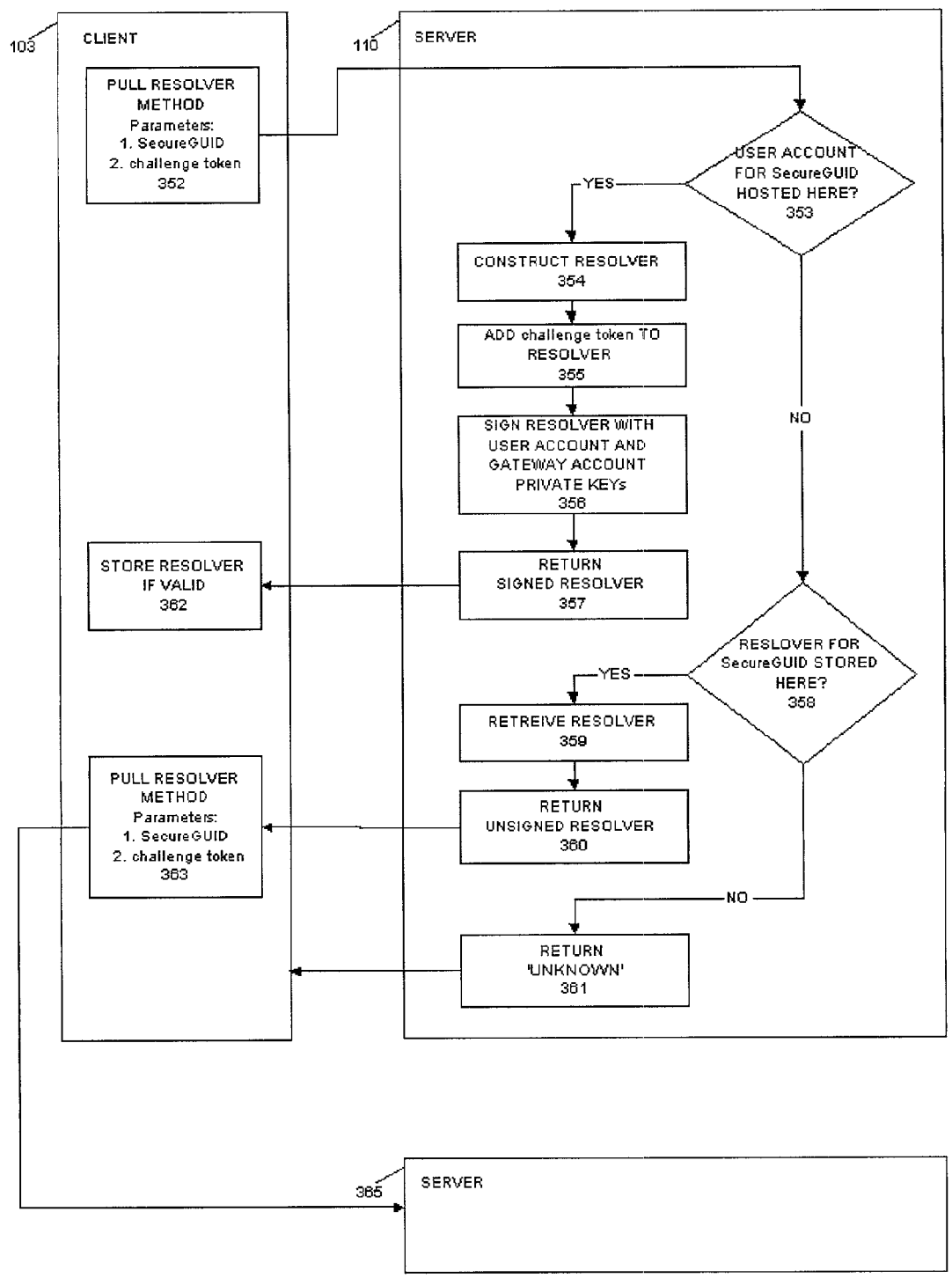
FIG. 4 illustrates in flow diagram form the operational steps whereby a resolver for a particular account is pulled from a server, given the account's SecureGUID.

FIG. 4 illustrates the process, in which a client 103 pulls a resolver for a particular account from a server 110. In step 352, the SecureGUID of the account for which a resolver is required is submitted by client 103 to server 110, with a challenge token. Step 353 checks that server 110 hosts a user account with the specified SecureGUID. If so, a resolver is constructed in step 354. The challenge token is entered into the resolver in step 355. The resolver is signed with the user and gateway account private keys in step 356. The signed resolver is returned to the client 103 in step 357. The client validates the resolver and stores it in step 362. The process for validation is described in the resolver signatures section below.

If step 353 establishes that server 110 does not host a user account with the specified SecureGUID, step 358 checks if a resolver for the account flagged as 'confirmed' is nevertheless stored on the server 110. If so, the resolver is retrieved in step 359. In step 360 it is returned unsigned to client 103. The client 103 re-invokes the process in step 363, on the URL of another server 365. This URL is contained in the returned unsigned resolver. The process thus repeats until a signed resolver is returned. To prevent loops, the URL from each unsigned resolver is held in the memory of client 103. The process terminates immediately if a URL is repeated. If step 358 establishes that a resolver for the account is not stored on the server 110, it returns the message 'unknown' to the client 103.

Figure 5:
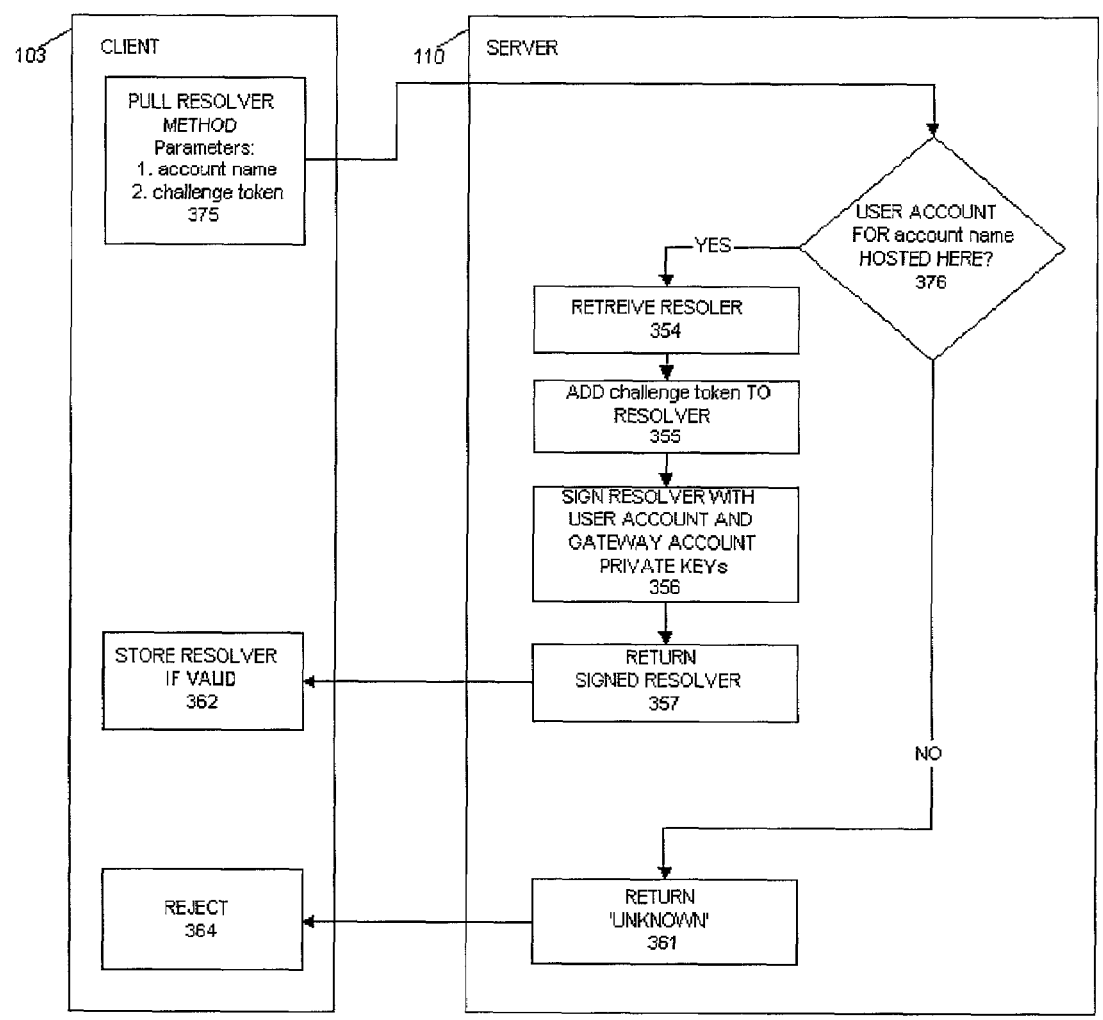
FIG. 5 illustrates in flow diagram form the operational steps whereby a resolver for a particular account is pulled from a server, given the account's name.

An alternative pull resolver method allows a resolver to be pulled by specifying an account name rather than a SecureGUID. This is a bootstrap method that is used in the instance that a user informs another user of their account name and host server URL. The method is invoked on this URL. FIG. 5 illustrates the process, in which a client 103 pulls a resolver for a particular account from a server 110. In step 375, the name of the account for which a resolver is required is submitted to the server, with a 32 bit challenge token. Step 376 checks that the server hosts a user account with the specified name. The remaining steps are equivalent to the identically numbered steps in FIG. 4. Note that the server will not attempt to return an unsigned resolver if it does not host the account. Account names for non-hosted accounts are treated as non-definitive because they are only unique within the namespace of their hosting server.

Figure 6:
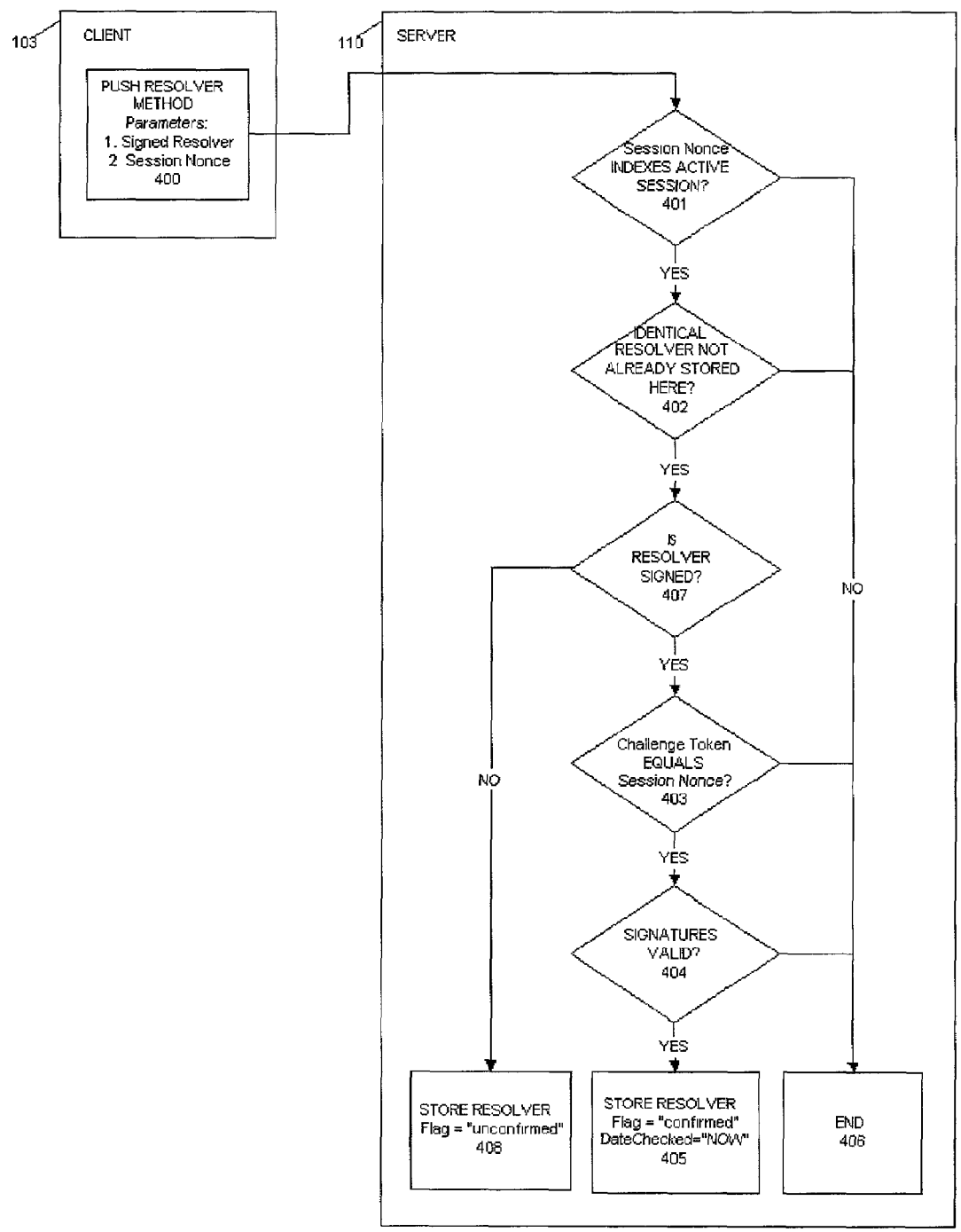
FIG. 6 illustrates in flow diagram form the operational steps whereby a resolver for a particular account is pushed to a server.

A resolver for an account may be submitted or pushed into a server. This inserts the resolver into the target server's resolver database. The process must take place within a session, which may be either an owner or root session. FIG. 6 illustrates the process, in which a client 103 pushes a resolver for a particular account to a server 110. In step 400, client 103 invokes the method on a server 110, parameterized with a resolver and a session nonce. In step 401, server 110 checks that the session nonce indexes a currently active session. In step 402 the server checks that it has not already stored an identical resolver in its database. A resolver is considered identical if it has identical child and parent fields. If an identical resolver is already stored, the process terminates.

In step 407, the presence of a signature in the resolver is checked for. If the resolver is unsigned, it is stored in the resolver database in step 408, flagged as 'unconfirmed'. If the resolver is signed, its challenge token is compared to the session nonce in step 403. Their equality establishes the contemporaneousness of the resolver. Note that Server 110 needs no knowledge of its actual source, i.e. the particular server that client 103 has pulled the resolver from. If the challenge token and session nonce are identical, the resolver signatures are validated in step 404. This process is described in the resolver signatures section. Steps 403 and 404 jointly prove that the source server that created the resolver currently has the account private keys. If both steps are is successful, the resolver is stored and flagged as 'confirmed' and its date checked field is set to the current system clock time in step 405. If any other resolvers exist for the same account, they are all flagged as 'unconfirmed', and their date checked fields are set to the current system clock time.

A client typically uses the pull and push resolver methods in combination. This allows it to pull a resolver from one server and push it into another server. This process is applied in two instances. First, user A may have the account name and URL of user B's account. User A may use this to pull a resolver for B's account from B's server, and push this resolver into their own server. This will allow A to subsequently locate B's account, login to it as a guest, and grant permission certificates to B. Second, user A may wish to push its own resolver into user B's server. This allows A to make their identity known on B's server. B can subsequently use this to locate A's account and login to it as a guest, and also to grant permission certificates to A. In both cases, A and B may actually be hosted on the same server. In this case, the respective revolvers are implicitly already present and does not need to be re-inserted into the resolver database.

Figure 7:
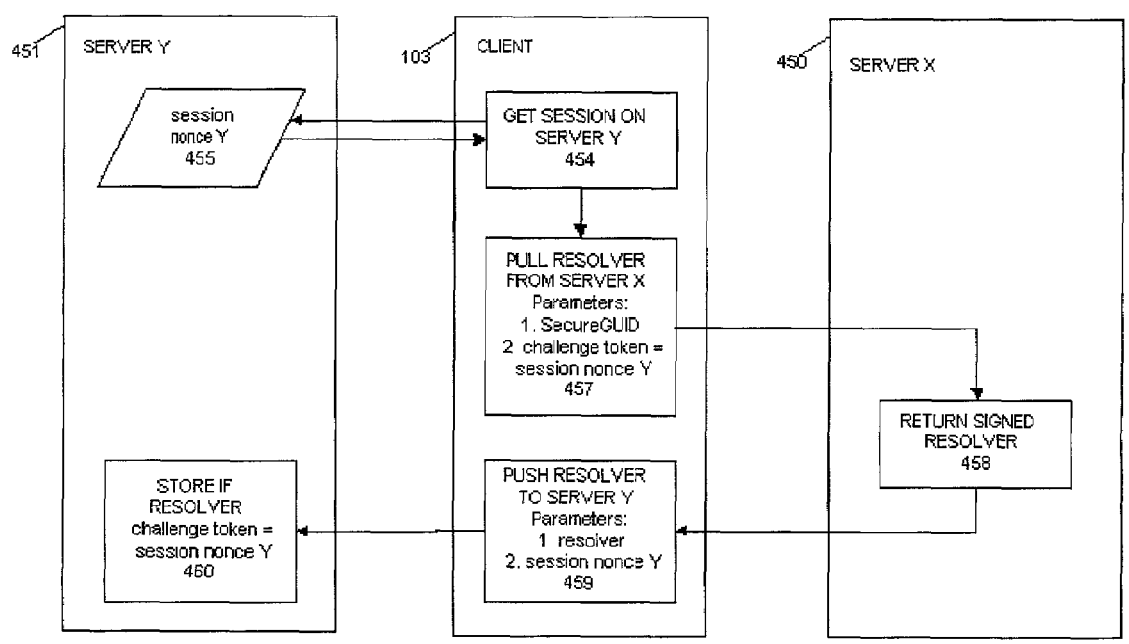
FIG. 7 illustrates in flow diagram form the operational steps whereby the methods of pulling and pushing a resolver are combined.

FIG. 7 illustrates the process. In steps 454 and 455, a client 103 establishes a session on a server 451 using the login method. The type of session is unimportant. In step 457, client 103 pulls a resolver from another server 450, for an account with a specified SecureGUID. Crucially, the challenge token that it specifies is the value of the session nonce from its session with server 451. In step 458, server 450 signs and returns the resolver, including the challenge token field. In step 459, client 103 pushes the resolver into server 451. In step 460, the resolver is processed according to the steps in FIG. 6.

If a server hosts a given account, it has access to the account's private key. The server uses this key to digitally sign resolvers it returns in response to pull resolver method calls that specify the given account. This applies to both user and gateway accounts. A server that can thus prove possession of an account's private key is considered to be the authentic location of that account. Signatures are constructed as follows:

1. A label that identifies the cryptographic hash and signing algorithms is created for the signature algorithm field.
2. Byte representations of the child, parent, challenge token, and signature algorithm field are concatenated into a byte array in a definitive order.
3. A cryptographic hash of this byte array is produced, according to the algorithm referenced in the signature algorithm field.
4. The hash is encrypted using the private key of the account referred to in the child field, according to signing algorithm referenced in the signature algorithm field. The result is the signature field.

The signature algorithm field is a two part identifier that specifies the combination of algorithms used to produce the digital signature. The first is an identifier for a cryptographic hash algorithm to produce a fixed length digest of the resolver fields. For example, the value 'SHA1' could specify use of the Secure Hash Algorithm 1 (SHA1—as described in U.S. Pat. No. 4,405,829 'Cryptographic communications system and method'). The second part specifies the asymmetric key cryptography algorithm that will be used to encrypt the hash itself, using the respective private key. For example, the value 'RSA' could specify the RSA algorithm (as described in U.S. Pat. No. 4,405,829 'Cryptographic communications system and method'). The full value of this field would thus be 'SHA1 with RSA'.

The signature in a signed resolver that is pushed into a server is validated before being stored and flagged as 'confirmed'. The criteria for successful validation is the equality of the following two values:

1. The result of decrypting of signature, according to the specified asymmetric cryptography algorithm, using the public key contained in the SecureGUID of the resolver's child field.
2. The result of the application of the specified hash algorithm to the concatenation, in canonical order, of byte representations of the resolver's fields (including the Challenge token, but excluding the signature).

A background operation processes accumulated resolvers in the resolver database that are flagged as 'unconfirmed'. In the preferred embodiment this is carried out by clients, on the server to which they are associated. In an alternative embodiment this may be carried out by the servers themselves or by other dedicated clients that have an account on a server that permits the relevant methods.

A list of resolvers that require processing is requested by the agent from the server. Theses are resolvers that are flagged as 'unconfirmed' and whose date checked field is null. For each resolver, the agent pulls a new resolver from its source server and pushes it back into the local server, according to the process described for the combined pull and push resolver method. The date checked field for each such resolver is set to the current clock time. Resolvers flagged as 'unconfirmed' whose date checked field is earlier than the system clock time are periodically garbage collected.

This process ensures three outcomes. First, that confirmed locations are established for accounts. Second, that account location changes can be safely learned from resolvers pushed into the server by any agent. Third, the resolver database is optimally pruned on an ongoing basis.

The resolve method returns the URL for a specified account SecureGUID, if a confirmed resolver for this account exists in the resolver database. The method is used by clients to retrieve an account's server's URL, prior to invoking any method relating to that account.

A core function of the system is to allow users to securely access certain resources in each others' accounts. Aliases allow users to persist (maintain) their own collection of links to other users' accounts. An "alias" is a reference in a source account to a target account. Target accounts may change location without invalidating aliases, as aliases are merely records of account identities not account locations.

An alias is a folder that has a SecureGUID in its alias account field. The SecureGUID is used to initiate a guest login to the target account. The login is invoked at the URL that the resolve method returns when given the SecureGUID as a parameter. An alias can be created using the SecureGUID of any target account whose resolver has previously been stored in the server's resolver database. The alias folder may optionally reference a folder in the target account, by storing the target folder's identifier in its alias folder field.

A realm is a named collection of folders. Realms expose otherwise private folders to users who have been issued certificates that grant them access to that realm. Thus, in order to access a folder within a guest session, a certificate for an appropriate realm must have been supplied within the lifetime of the session. This restriction only applies to guest sessions. In owner sessions, realms are ignored. Zero or more realms may be defined per account. Realms are non-exclusive, i.e. folders may fall into more than one realm. Also, the same realm name may appear in multiple accounts hosted on multiple servers. For example, a realm might represent the distributed resources that all employees of a multi-divisional company should have access to. This realm may appear in a multitude of accounts of its departments and employees, hosted across various servers that the company operates. A certificate that grants permission to a realm allows the bearer to access any folder classified in that realm, irrespective of which account uses that realm name to classify folders.

There are numerous possible approaches to classifying resources into realms. The preferred approach is for the user to define sub-trees of their folder directory tree. A particular realm is specified as one or more realm 'root' folders and zero or more realm 'cut point' folders. The folder identifiers are stored in a database and associated with a realm name. A realm root folder defines the start point of a realm tree. This folder and its descendants fall within the realm. Multiple roots may be specified. For a given realm, a realm root cannot contain another as its descendant. A realm cut point defines the end point of a realm tree branch. This folder and its descendants are excluded from the realm. Multiple cut points may be specified. For a given realm, a cut point cannot contain another as its descendant. Also, a cut point must be a descendant of a realm root.

Figure 8:
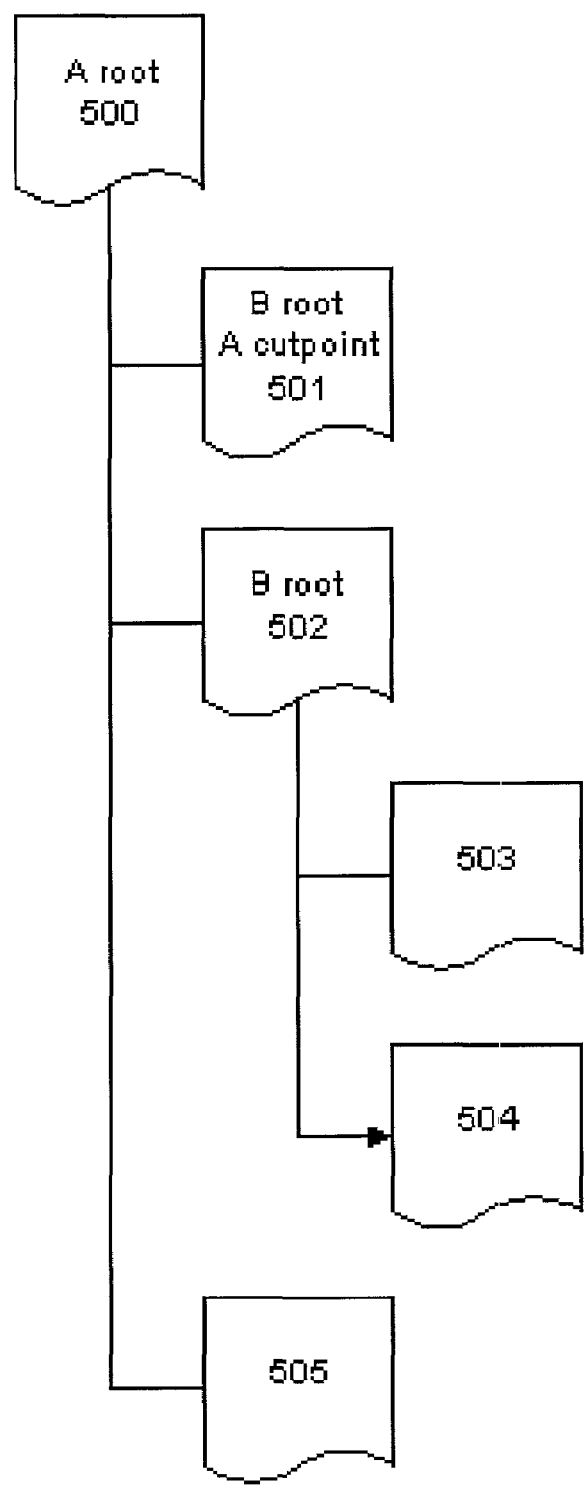
FIG. 8 illustrates in block diagram form a folder tree with realm definitions.

FIG. 8 illustrates a simple folder tree that has definitions for two realms, A and B. Realm A has a root at folder 500 and a cut point at folder 501. Realm A thus contains folder 500, and folders 502 to 505. Realm B has two roots, at folders 501 and 502. Realm B thus contains folders 501 to 504. The realms overlap, so folders 502 to 504 are in both realms A and B.

Each realm definition is associated with a globally unique realm name. From a given user's perspective, there are two types of realm name. The first are those that the user originates. The user is the authority over such a realm, i.e. access to the realm is within their full control. The user has the right to grant other users access to the realm, and to choose which of these users also has this granting right delegated to them. The second type are realm names that are originated by other users. In this case, the user is not necessarily in a position to specify which users have permission to the realm. However, they may use this realm name to expose folders to users that have been granted access to the realm by its originator (or one of their delegates). This is a crucial feature in reducing the burden of managing secure file sharing between distributed users. If a group of N users wish to collectively share resources distributed across their respective N accounts, the number of explicit permissions required is N(N−1). If however they all use a realm name originated by one user, the number of explicit permissions required reduces to N.

As an example, personnel departments' accounts contain contact lists, i.e. collections of aliases to all staff accounts. Business contact information in each staff members' account is classified using an identical realm, as are the contact lists themselves. Staff across the enterprise are explicitly granted permission to this realm by a personnel department (or a delegate of it). Staff are thus immediately able to access contact information in each others' accounts, wherever their accounts are variously hosted. Because of the distributed nature of the realm, each staff member in the hierarchy does not need to horizontally grant the permission to every other staff member.

A realm name is a composite of the SecureGUID of the realm originator, a descriptive character string, and a serial number. The character string is typically human readable (for example 'executives' or 'family'). The serial number is unique across all realms containing the same SecureGUID. This condition is enforceable because such realm names are by definition created by the same user. The global uniqueness of SecureGUIDs guarantees that realm names themselves are globally unique.

Realms control the behavior of methods called within guest sessions. Specifically, if a folder management method is parameterized by a nonce that indexes a guest session, permission to the specified folder must already have been be established within the session for the method to succeed. Such permissions are expressed as a list of 'real stamps' in each session state record. The process by which realm stamps are acquired is detailed in the realm stamp method section below.

Figure 9:
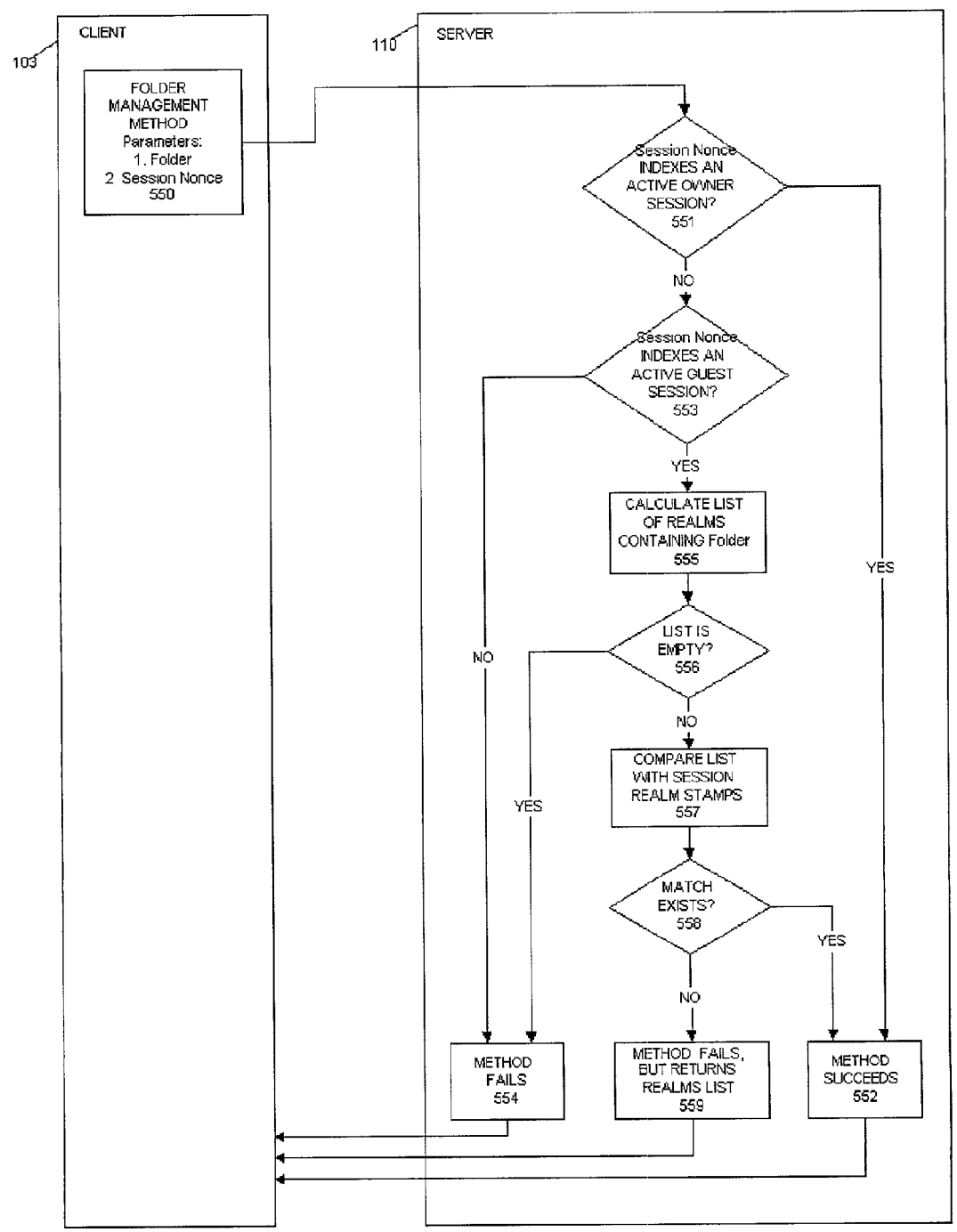
FIG. 9 illustrates in flow diagram form the operational steps whereby realms control the behavior of methods called within guest sessions.

The process is illustrated in FIG. 9. In step 550, client 103 invokes a generic folder management method on server 110. It specifies the folder and a session nonce. Step 551 establishes whether the session nonce indexes a currently active owner session. If so, no further checks are required and the folder management method completes in step 552, since an account owner is not restricted in their access to the account's resources. Failing this, step 553 establishes whether the session nonce indexes a currently active guest session. If it does not, the method immediately fails in step 554. If it does, in step 555 a list of all realms containing the specified folder is created in memory, by referring to the realm definitions. If the folder is identical to or below any realm root, and not identical to or not below a cut point for the same realm, the folder is considered to be within the realm. Step 556 checks that this list is not empty. If it is, the folder is inaccessible to all guest users, i.e. it has not been exposed using any realm. The folder management method thus fails in step 554.

If the list is not empty, in steps 557 and 558, the realms in the list are checked for an identical match with any of the realm stamps in the session state record. A match implies that user has already submitted, within the session, a certificate granting them access to one of the realms containing the folder. The method succeeds in step 552. If a folder is within multiple realms, it is only necessary for the guest user to have a realm stamp for one of these realms to have access to it. However, if the folder management method is either write header, write data, remove folder, or remove data, the realm stamp must state a 'read/write' permission. If no match exists, the method fails but nevertheless returns the list of realms that contain the specified folder. The user will subsequently invoke the realm stamp method to submit a certificate for one of the realms in the list, if such a certificate is available to the user. The session state maintained on the target server contains a list of accumulated realm stamps. These record the fact that the guest user has provided certificates for these realms and that the certificates were successfully validated by the target server.

Users may be granted access to a realm by another user. A certificate is an expression of a permission to a named realm. It grants access to all folders classified in the named realm, in any account. The permission is granted by the user who originates the realm name. The recipient may receive the certificate directly from the originator, or via any number of intermediary 'delegates'.

A certificate consists of an ordered sequence of individual 'grants'. Within a certificate, each grant refers to the same realm. In each grant, an issuing user grants a recipient user the permission to access the realm. In the case where the realm originator issues the certificate directly to the user, there is only one grant. This is the 'realm originator grant'. In the case where there are intermediate delegates, there will be one or more grants appended to this grant. Each grant states whether its recipient can act as a 'delegate'. If this is the case, the recipient may issue certificates for the realm to other recipients, by appending another grant to their own certificate.

Each grant comprises the following fields:
1. Issuer
2. Recipient
3. Realm Name
4. Delegation Right
5. Access Mode
6. ExpiryDate
7. Algorithm
8. Signature Whereas a certificate is a chain of separate grants each having a recipient, the 'recipient' of the certificate is defined as the recipient of the final grant. Similarly, the 'issuer' of the certificate is the issuer of the final grant.

Certificates and grants are in the public domain. Identical copies of a particular grant may be present on any number of servers with no negative impact on security. A grant is only effective when it is the final grant in a certificate presented by the realm stamp method within an active guest session. The private key of the guest must necessarily have been used to activate the session, and the certificate is only accepted if the recipient of its final grant is identical to the SecureGUID of the session initiator. Thus, only the recipient of the final grant of a certificate may successful submit the certificate within a guest session. A description follows of each field in a grant.

Grant-Issuer This is the SecureGUID of the account belonging to the user who is granting the permission.

Grant-Recipient This is the SecureGUID of the account belonging to the user who is receiving the permission.

Grant-Realm Name This is the name of the realm for which permission is being granted. In the case of a realm originator grant, the SecureGUID part of the realm name will be identical to the issuer SecureGUID.

Grant-Delegation Right This is a non-negative integer. A non-zero value represents the right of the recipient to appear as the issuer of a subsequent grant in a certificate. The delegation right in each grant within a certificate must decrement by at least one the delegation right in the previous grant within the certificate. This allows a distribution of responsibility for granting realm permission, i.e. a realm originator may entrust other users the right to grant permission to that realm. For example, a realm for executives may be originated by head office. Certificates for this realm may be issued to divisional heads. If the grant in these certificates has a non-zero delegation right, the divisional heads may issue certificates for this realm to their staff. These certificates would each append a second grant to the first. These may in turn have a non-zero delegation right, allowing the creation of further certificates containing three or more grants.

Grant-Access Mode The value of this field is either 'read', 'read/write', or 'transfer'. This determines the type of method that the recipient can invoke on folders within the named realm. A value of 'read' allows retrieval of folders only, i.e. the methods to read a header, read data, and read children. A value of 'read/write' additionally allows the methods to write a header, write data, remove a folder, and remove data. The value of 'transfer' is reserved for the account migration process, detailed in the migration section. If the grant has a non-zero delegation right, the grants that the delegate appends have a restriction with respect to access mode. This restriction states that a grant with 'read/write' access mode cannot be appended to a grant with 'read' access mode.

Grant-Expiry Date The expiry date is chosen to represent the minimum period within which the permission is not expected to need revoking. The format of this field is defined by ISO 8601:1988 (E) "Data elements and interchange formats—Information interchange—Representation of dates and times". The expiry date does not imply the actual point at which the issuer wishes the permission itself to terminate. Grants are updated by a background process described elsewhere in this specification. The grant may, for instance, have a short expiry yet be repeatedly updated by the issuer over a long period. The grant's expiry date merely limits the time validity of the currently held expression of that permission. It allows the issuer to specify a maximum interval within which the grant may remain valid following revocation, if revocation is not being explicitly checked for.

Grant-Algorithm This two part identifier specifies the combination of algorithms used to produce the grant's digital signature. This is equivalent to the algorithm fields in a resolver, described in the resolvers section.

Grant-Signature The signature is the result of encrypting a hash of the grant fields. The process that produces it is as follows: 1) Byte representations of the grant fields (excluding the signature) are concatenated into a byte array in a predetermined order. 2) A hash of this byte array is produced using the algorithm specified by the grant's algorithm field. 3) This hash is encrypted using the private key of the grant issuer, according to the algorithm specified by the grant's algorithm field.

A user may present certificates during a guest session using this method. If the certificate is valid (see certificate validation process section) and identifies the guest user's SecureGUID as the recipient of its final grant, the realm name and access mode from the certificate is entered into the stamps field of the session state record. This will permit the guest user to access folders within the realm, according to the methods permitted by the access mode specified in the certificate. The guest user has already been authenticated, when activating the guest session.

The method takes a session nonce and a certificate as parameters. The initiator SecureGUID in the session state indexed by the nonce is compared to the SecureGUID of the recipient of the final grant in the certificate. If these are identical, the certificate is considered to belong to the guest user. The certificate is validated using the certificate validation process. If it is valid, the realm name is added to the 'stamps' field of the session state record.

A certificate is considered valid if each of its grants meet certain conditions, as well as certain conditions regarding their interdependency. The certificate validation process is applied to the ordered chain of grants in the certificate. The validation condition are as follows:

1) The realm name is identical in each grant.
2) In the first grant, the SecureGUID part of the realm name is identical to the SecureGUID of the issuer.
3) The SecureGUID of the issuer of each grant is identical to the SecureGUID of the recipient of the previous grant, if there is such a grant.
4) The delegation right of each grant decrements by at least one the delegation right in the previous grant, if there is such a grant.
5) The delegation right of each grant is a non-negative integer.
6) The access mode of each grant is either 'read' or 'read/write'.
7) The access mode of any grant cannot be 'read/write' if it is preceded by a grant with an access mode of 'read'.
8) The expiry date of each grant is ahead of the current system clock time.
9) In each grant, the following two values are identical:
   i) The result of decrypting of signature, according to the specified asymmetric cryptography algorithm, using the public key from the issuer's SecureGUID.
   ii) The result of the application of the specified hash algorithm to the concatenation, in canonical order, of byte representations of the grant's fields (excluding the signature).

While a certificate may be valid according to the validation criteria, the issuer of a particular grant within it may since have revoked the permission to the realm, as described in the revoke grant method section. In the preferred embodiment, such a vestigial grant is nevertheless considered valid up to its expiry data. Revocation is experienced as a failure to retrieve an updated grant, as described in the retrieve grant method section.

In a critical security situation, revocation may be required to have immediate impact. Thus in an alternative embodiment of the system, a certificate presented during a guest session for access to a realm is considered only to be evidence of permission, not a permission itself In this case, the server would not validate the certificate's actual grants, but would itself anonymously request copies of each grant in turn directly from their respective issuers. This is achieved using the retrieve grant method section, and requires that the submitted certificate be bundled with (unsigned) resolvers for the issuer of each grant it contains. Resolvers for grant issuers that are not already resolvable are pulled using the pull resolver method, invoked at their host servers locations as suggested by the supplied un-signed resolvers. This process rebuilds a chain of fresh grants, if no recipient has been revoked. The validation process is thereafter identical.

A user will be the recipient of a number of certificates, pushed to their server by other users as described in the push certificate method section. The grants contained in the certificate are stored as individual records in a grant database on the server. The sense of their chaining together to form a particular certificate is not maintained.

The certificates that users of a given server collectively receive are likely to have grants in common. Particularly, any grant with a non-zero delegation right will appear identically in all certificates that were created by appending grants to it. The grant database will not hold multiple copies of grants with identical essential attributes. These essential attributes are issuer, recipient, and realm name. When a received grant's essential attributes are identical to those of a stored one, priority is given to the higher delegation right, then to the later expiry date.

Increasing the delegation right of a stored grant in this way may alter the result of subsequent extractions for certificates that contain the grant as a delegate. For a given realm and final recipient, a different ancestry of grants may be extracted. This has no impact on the validity of the certificate. Also, it does not unduly improve the certificate's 'power' with respect to delegation right, as this is always constrained by the value of the delegation right in the final grant.

A server may store multiple grants for a given recipient and realm name, if their issuer fields differ. This accommodates a user receiving certificates for a given realm from multiple issuers. However, only one such grant is chosen as the user's appointed issuer of permission for that realm. Each grant record has a flag in the database indicating its status, the possible values of which are 'unconfirmed' and 'confirmed'. A confirmed status indicates that the grant expresses the recipient's choice of issuer for permission to that realm. Confirmed grants are the ones that new grants issued by delegate users are appended to. Grant status is by default 'unconfirmed'. Strictly one grant per recipient and realm name combination may be flagged as 'confirmed'. Additionally, each grant record has a 'date checked' field. This is a time stamp which marks the moment when the status of the grant is determined. The status flag and date checked field both relate to the recipient's usage of the grant, and are not specified by the grant's issuer.

In the preferred embodiment, the status is immediately determined in the case that the recipient of an incoming grant is hosted on the server itself. The grant record's status flag is immediately set to 'confirmed' if it is the first grant that is pushed to the server for a particular recipient and realm name combination. The status of subsequently received grants for the same recipient and realm name combination is set to 'unconfirmed'. In both instance the date checked field is set to the current time. In an alternative embodiment, the user may participate in the choice of issuer for permission to a realm. In other words, the user may choose or alter at a later date which grant to flag as 'confirmed' from amongst multiple grants for identical realm names, for which they are the recipient. When the recipient of an incoming grant is not hosted on the server, its status flag is set to 'unconfirmed' and its date checked field is set to null. Such a grant will subsequently pass through the process described in the grant maintenance section to establish its status.

An 'access control grant' is a grant issuer's own of a grant. These grants are regularly re-signed to keep their expiry dates valid, as described in the re-signing section. They are deleted if the recipient does not choose the issuer as their appointed issuer for a particular realm, as described in the garbage collection section.

These grant records make use of two additional fields, 'expiry period' and 'cancellation date'. The expiry period is a time value which is added to the current time to produce an expiry date, at the moment that a such a grant is signed. The cancellation date is the time after which the grant will not be re-signed.

Figure 10:
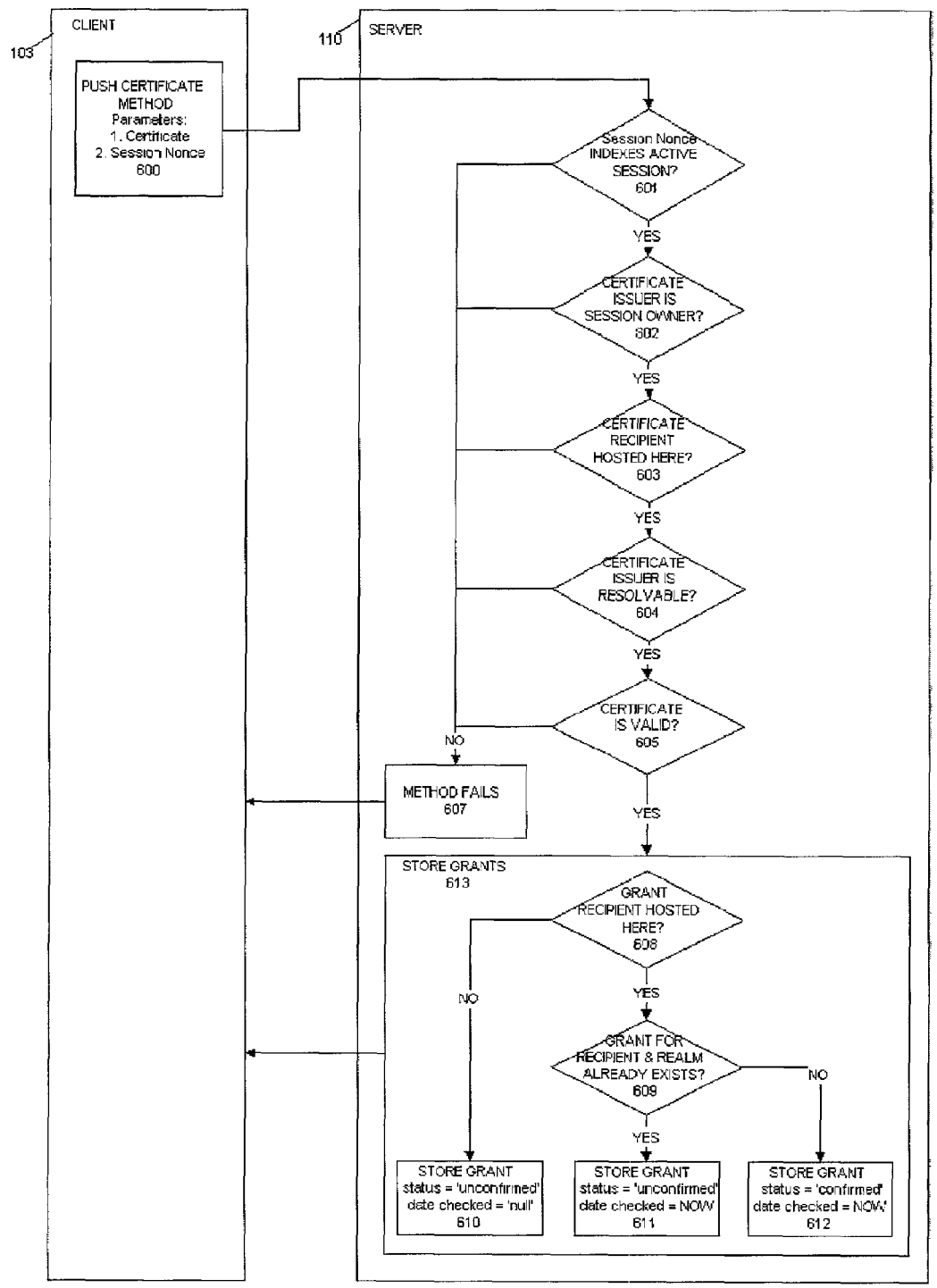
FIG. 10 illustrates in flow diagram form the operational steps whereby a certificate is pushed to a target server.

The push certificate method is used by a client to insert a certificate into a target server. The client is acting on behalf of the issuer of the certificate, and pushing it to the server on which the certificate's recipient is hosted. FIG. 10 illustrates the process. In step 600, a client 103 invokes the push certificate method on a server 110, parameterized with a session nonce and a certificate. Step 601 checks that the session nonce indexes an active session. Step 602 checks that the certificate's issuer (i.e. the issuer of the its last grant) is identical to the initiator SecureGUID in the session state indexed by the nonce. Step 603 checks that account of the certificate's recipient (i.e. the recipient of the its last grant) is hosted on the server.

Step 604 checks that the certificate's issuer is resolvable on the server. This condition is crucial for the subsequent renewal of grants, as described in the grant maintenance section. If it is not resolvable, the method will fail and the client must push a resolver for the issuer to the target server before retrying, using the process described in the combining pull and push resolver methods section.

Step 605 checks that the certificate is valid according to the criteria described in the certificate validation process section. If all these conditions are met, the grants contained in the certificate are stored by the server in step 613. The steps 608 to 612 are individually applied to each grant in the certificate. Step 608 checks that the grant's recipient is hosted on the server. If it is not, it is stored in step 610 with its status flag set to 'unconfirmed' and date checked field set to null. If the recipient is hosted on the server, step 609 checks that it is the first grant with the given recipient and realm name combination. If so, it is stored in step 612 with its status flag is set to 'confirmed' and date checked field set to the current system clock time. If not, it is stored in step 611 with its status flag is set to 'unconfirmed' and date checked field set to the current system clock.

The issue grant method creates and stores an access control grant in the issuer's own grant database. It will only succeed if parameterized by a nonce indexing an active owner session. The method takes the parameters recipient SecureGUID, realm name, delegation right, access mode, expiry period, and cancellation date. The issuer of the created grant will be initiator SecureGUID in the session state indexed by the nonce.

If the issuer is identical to the SecureGUID part of the realm name, a realm originator grant is created, without restriction on the other fields in the grant. If these are not identical the issuer is acting as a delegate, and must have the necessary permission to create the grant. The server will check that the issuer itself has a grant for the realm with non-zero delegation right greater than the specified delegation right parameter. Also, this grant must have 'read/write' access mode if this is the mode specified in the access mode parameter. The method will fail if these conditions are not met.

The client will follow this process installing a complete certificate on the server hosting the grant's recipient account. The certificate will have the newly created grant as its final grant, with supporting grants to provide a valid chain. This is retrieved using the retrieve certificate method, and then pushed to the target server using the push certificate method.

The revoke grant method disables an access control grant from the issuer's own grant database, by setting its cancellation date field to the current clock time. The method takes as parameters a session nonce, recipient SecureGUID, and realm name. It will only succeed if parameterized by a nonce indexing an owner session. The method acts upon any record in the grant database matching these respective fields, with issuer equal the Initiator SecureGUID in the session state indexed by the nonce.

The retrieve certificate method returns a complete certificate from the grant database, comprising one or more grants. The method does not require a session nonce parameter, as grants are in the public domain for reasons detailed in the Certificates and Grants section. The method takes as parameters the SecureGUID of the recipient of the required certificate, a realm name, and optionally the SecureGUID of the issuer. The method is invoked in two instances. First, to retrieve a certificate that the user is the recipient of, so that they may gain access to a realm in a simultaneous guest session. In this case, the issuer parameter need not be specified. Secondly, to retrieve a certificate that the user is the issuer of, to subsequently push it into the recipient's server. In this case, the issuer parameter is specified.

Figure 11:
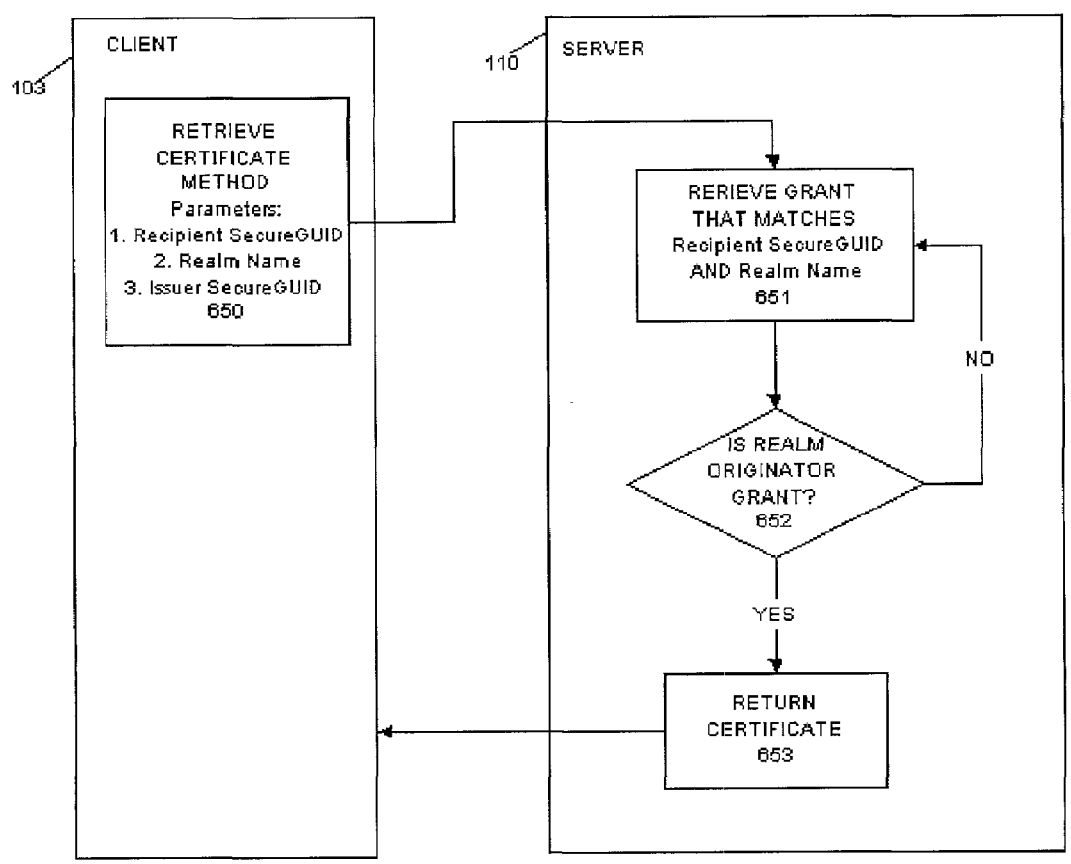
FIG. 11 illustrates in flow diagram form the operational steps whereby a complete certificate, comprising one or more grants, is retrieved from a server.

FIG. 11 illustrates the process. In step 650, a client 103 invokes the retrieve certificate method on a server 110. In step 651 a grant is retrieved, if it exists, from the grant database. If the SecureGUID of the issuer is not specified, the grant that is retrieved will be the one flagged as 'confirmed' which matches the specified recipient and realm name. If the SecureGUID of the issuer is specified, the grant that is retrieved will be the one which has the specified issuer, recipient, and realm name. Step 652 checks if this is a realm originator grant (i.e. its realm name SecureGUID matches its issuer SecureGUID). If so, the certificate consists of only one grant and is returned in step 653. If not, the process is recursive. Step 651 is repeated, with recipient now equal to the issuer of the previously retrieved grant. Thus for previously retrieved grant A, a grant B is retrieved whose recipient is the issuer of grant A. In the certificate, B will precede A. Grant B must strictly have a delegation right higher than A's by at least one. Grant B must also strictly have a 'read/write' access mode if this is A's access mode.

Only grants with valid expiry dates are considered. This recursion continues until a realm originator grant is found.

If a valid chain of grants cannot be constructed, the method fails. It should be noted that there is not necessarily a single unambiguous chain of grants. For a given recipient and realm name combination, there may multiple grants with differing issuers. Multiple valid chains may be constructed in this case. If grants are flagged as 'confirmed', they will be chosen in preference to those flagged 'unconfirmed', although this is not critical as any valid chain will serve the required purpose.

The retrieve grant method requests a copy of a specified grant from the grant database. It is invoked as part of the process described in the grant maintenance section. Its function is to retrieve a copy of a grant from the server of either the grant's issuer or its recipient. The method takes as parameters the SecureGUIDs of the recipient and issuer, and a realm name. The method does not require a session nonce parameter, as grants are in the public domain for reasons detailed in the certificates and grants section. A grant is retrieved, if it exists, from the server's grant database. It must be flagged as 'confirmed', and match the specified recipient and realm name. If the SecureGUID of the issuer of the grant is identical to the method's issuer SecureGUID parameter, the grant alone is returned.

If the issuer of the is grant is not identical to the method's issuer SecureGUID parameter, the grant's recipient has in the interim chosen a different issuer as their appointed issuer for permission to the given realm. This is either because their permission was revoked by their previous choice of issuer but still available from another issuer, or because the user explicitly chose a new issuer according to the alternative embodiment referred to in the Grant Storage section. In this instance, the grant and its supporting grant chain is retrieved and returned in an equivalent manner to that described in the retrieve certificate method section. If the recipient has been revoked (i.e. the cancellation date for the requested grant is earlier than the current time) or the grant does not exist, the retrieve grant method returns a revocation exception.

Three background grant maintenance processes ensure that grant databases are kept up-to-date on each server. These are carried out automatically on individual grants, i.e. reference is not made to the chains which grants may be constituents of The first process keeps access control grants current by re-signing them with new expiry dates as they expire. The second process retrieves replacement grants from other servers to maintain valid expiry dates, and also establish values for their status flags. The third process garbage-collects redundant grants. These three processes ensure that permissions granted by users hosted on the server do not unduly default, that users may retrieve valid certificate chains from the grant database on an ongoing basis if no revocations have taken effect, and that the grant database is kept optimally small.

In an alternative embodiment these functions may be carried out by the servers themselves, acting as clients to other servers. In the preferred embodiment, the second function (grant renewal) is carried out by the server's associated client, or a dedicated maintenance client whose own account has the necessary permissions. This acknowledges the scalability problems that may result from having multiple concurrent processes running on a traffic intensive server.

A grant is characterized by four Boolean states which jointly determine which of the maintenance processes are applied to it, namely:
a) Recipient is hosted here
b) Issuer is hosted here
c) Status flag equals 'confirmed'
d) Date checked does not equal null FIG. 12 specifies the processes applied to each grant according to their combination of these states. Garbage collection is applicable to all grants given certain conditions, so is not listed as a process in the table. Note that some combinations of states are not possible. Particularly, if a status flag is 'confirmed' it cannot also have a null value for its date checked field. Also, if a grant's recipient is hosted on the server itself, its date checked flag is necessarily not null for reasons described in the grant storage section. The three maintenance processes of re-signing, grant renewal, and garbage collection are detailed below.

1. Re-Signing of Access Control Grants

Access control grants whose expiry date is imminent are given a new expiry date and re-signed, if their cancellation date field is later than the current system time. The new expiry time is the lesser of the cancellation date, or the sum of the current time and the expiry period. The new grant signature is created as described in the grant signature description. The server necessarily has the private key required to create the signature, since it hosts the account of the issuer of all access control access control grants in its database. The status flag and date checked fields are not altered by this process. If an access control grant's cancellation date field is earlier than the current system time, it is ignored by the re-signing process. The garbage collection process will identify it for removal.

2. Grant Renewal

Grants that require renewal are those that are:
a) flagged as 'confirmed' and approaching expiry (unless both recipient and issuer are hosted on the server) and;
b) flagged as 'unconfirmed', whose date checked field equals null.

For each such grant, a renewal is requested using the retrieve grant method. The location at which the retrieve grant method is invoked depends on whether or not the recipient of the grant is hosted on the server itself. If the recipient of the grant is hosted on the server, the grant has the role of a final grant in a certificate previously pushed to the server. The retrieve grant method is invoked on the server of the grant's issuer to acquire a renewal, i.e. a hopefully-new copy of the access control grant. The returned grant will overwrite its expiring counterpart if it is identical in its essential attributes.

If recipient of the grant is not hosted on the server, the grant has the role of a delegate grant within a certificate previously pushed to the server. The retrieve grant method is invoked on the server of the grant's recipient to acquire a renewal, i.e. a copy of the recipient's copy of that grant. This represents the recipient's choice of appointed issuer for permission to the given realm. If a retrieved grant is identical in its essential attributes it overwrites its expiring counterpart (unless it is also an access control grant, i.e. the issuer is locally hosted). Its status flag is set to 'confirmed', and its date checked field is set to the current clock time. If the recipient has been revoked, the returned grant will not have a renewed expiry time or may be null if it has been garbage collected. The date checked field for the grant record is set to a time later than the expiry date of the grant. The garbage collection process will thus identify it for removal.

If the grant's recipient has since chosen a different issuer for permission to the realm, the retrieve grant method will instead return a certificate, i.e. a chain of grants that support a new final grant embodying the new choice of issuer. The existing grant's status flag is set to 'unconfirmed', and its date checked field is set to the current clock time. The returned chain is stored on the server as described in the grant storage description, unless the existing grant is an access control grant.

3. Garbage Collection

Grant records are garbage collected from the database in the three following cases:

a) Redundant grants, i.e. those that have been rejected in favor of another issuer for the given realm. These are grants whose status flag is 'unconfirmed' and whose date checked field is non-null. In an alternative embodiment of the system, these are not garbage collected until their expiry data, giving the user the chance to switch to using them as the preferred issuer for the realm. Note that this includes rejected access control grants, i.e. those that are not flagged as 'confirmed' on their recipient's server. Such grants do not embody the recipient's choice of issuer for a given realm.

b) Revoked grants, i.e. those that could not be renewed. These are grants whose date checked field is later than their expiry date field.

c) Revoked access control grants, i.e. those that should not longer be re-signed. These are grant records whose cancellation date is earlier than the current system clock time.

During the renewal process, there will be instances where a grant recipient is not resolvable. In other words, it will not be ascertainable which server to retrieve a new grant from. Specifically, the recipient quoted in a grant having a delegate role within a chain certificate is not necessarily resolvable by the server onto which the certificate is pushed.

However, the issuer of the final grant in this certificate is necessarily resolvable on the server, for reasons described in the push certificate method section. This account is identical to the recipient of the penultimate grant. The SecureGUID of the recipient of any grant in a chain is thus always resolvable by the server hosting the recipient of the grant below it in a chain of grants forming a certificate.

If a grant recipient's SecureGUID turns out to be irresolvable, the process retrieves a list of the recipients of all grants that quote this account as their issuer. One of these may be resolvable. If so, a resolver is pulled from its server for the SecureGUID of the locally un-resolvable grant. If not, the grant renewal is deferred until the next cycle of the renewal process. This ensures that resolvability of all grant recipients is ensured over successive cycles of the background grant renewal process. This 'trickles up' through the recipients of all grants in a chain, starting from the final grants which is always necessarily resolvable for reasons described in the push certificate method section.

The push grant method is used by clients carrying out the server administration process described in the grant maintenance section. The method inserts into the grant database a grant, previously collected from another server using the retrieve grant method. The method will only succeed if parameterized by a nonce that indexes an active owner session for a gateway account. Such an account has the privilege of being able to specify values for a status flag and date checked value, overriding the defaults employed by the push certificate method. The method takes as parameters a session nonce, a grant, a status flag, and a date checked value.

To transport a grant, i.e., marshal a grant or a chain of grants forming a certificate across a network connection within the body of a remote procedure call, an XML (eXtensible Markup Language) representation of it is produced. Representations of the signatures, UUIDs, and public keys are coded in as Base64 (defined in RFC-1341 'Multipurpose Internet Mail Extensions: Mechanisms for Specifying and Describing the Format of Internet Message Bodies', section 5.2).

A user may migrate their account between servers without relinquishing the account's SecureGUID and private key. The process involves the following steps. The user is assumed to currently own account A, hosted on a source server, which is to be migrated to a destination server.

a) Account A's entire assets are exported to an intermediary file format, using the method described in the export method section.

b) A new account, B, is created on the destination server.

c) A 'transfer' certificate is issued by account A to account B, and pushed to the destination server. This consists of a single realm originator grant whose access mode is 'transfer'. The certificate is a permission for account B to appropriate account A's identity, signed by account A's private key.

d) By presenting the transfer certificate, the private key of account A is retrieved from the source server by the client acting on behalf of account B. This key is encrypted using account B's public key. The source server thus relinquishes the hosting of account A. This process is detailed in the release identity method section.

e) On the destination server, the returned encrypted key is decrypted using account B's private key. Account B's SecureGUID identity is replaced by that of account A, and its private key is replaced by that of account A. The process is detailed in the switch identity method section.

f) Account A's assets are imported from the intermediary file format, using the method described in the import method section.

The export method retrieves all the assets from an account and returns them as a single XML export file. The method participates in the account migration process. The method is parameterized by a session nonce, which must index an owner session. The following assets from the account of the session owner are included in the XML export file:

a) the account's folder structure,
 b) the account's folder data;
 c) all access control grants issued by the account;
 d) all grants that are constituents of all certificate chains whose final grant recipient is the account;
 e) all resolvers for issuers of final grants in such chains;
 f) all resolvers for aliases in the account's folder structure.

The method and may also be used to allow a user to store a backup of their account onto another system such as a desktop computer.

The import method retrieves account assets from an XML export file and enters them into an account. The method participates in the account migration process. The method is parameterized by a session nonce and an XML export file. The nonce must index an owner session. The method adds the assets to the account of the session owner. The following methods are employed to enter the respective assets from the XML export file: write header method, write data method, push certificate method, and push resolver method. The method and may also be used to allow a user to restore a local backup to their account.

The release identity method participates in the account migration process, and is the first stage of transferring an account identity from a source server to a destination server. It is invoked on the source server, by the client associated with the destination server, on behalf of an account B. It releases the identity of an account A so that it may be appropriated by account B. The method returns the private key of account A encrypted with the public key of account B, stores an unsigned resolver for the subsequent location of account A (i.e. the current location of account B), and causes the deletion of account A's folders. The method is parameterized by a session nonce and a 'transfer' grant of the type detailed in the migration section. The nonce must index a guest session. The session owner, Account B, must be resolvable on the server, and must be the recipient of the submitted grant. The issuer of the grant, account A, must be hosted on the server. The submitted grant must have an access type of 'transfer' and must be an unexpired realm originator grant. The private key of the account A is encrypted using the public key of the account B (this being part of account B's SecureGUID). This encrypted key is returned in the method's response.

A locator is created on the server, mapping account A to the current location of account B. Note that account B is already resolvable by the server, as a precondition of the method. The server will from this point on respond to pull resolver method invocations for account A with an (unsigned) resolver indicating its new location. Account A's folders, and access control grants issued by A, are flagged for garbage collection from the database by a background process.

The switch identity method participates in the account migration process, and is the second stage of transferring an account identity from a source server to a destination server. It is invoked on the destination server by its associated client, on behalf of an account B. The method substitutes account B's SecureGUID and private key, in favor of a supplied SecureGUID and private key. These previously appropriated from an account A using the release identity method. The switch identity method is parameterized by a session nonce, the SecureGUID of account A, and the encrypted private key of account A. The nonce must index an owner session. The session owner, i.e. the initiator SecureGUID in the session state indexed by the nonce, indicates the account B whose identity is to be changed. The server uses the private key of account B to decrypt the encrypted private key of account A. The private key of account B is replaced by the private key of account A. The SecureGUID of account B is replaced by the SecureGUID of account A. If there exists a resolver indicating the former location of account A, this resolver is deleted from the destination server's database.

In the preferred embodiment, the user is presented with interfaces running within a browser or device capable of rendering markup language (such as HTML, WML, or VoiceXML). These front end applications that use the application programming interface of this description, isolating the user from the details of the various method calls. The user can thus navigate through their account's folder tree, read, replace, add, and delete folders. Additionally, via the interface the user can pull the resolvers of other users, push their own resolvers into other users' servers, create aliases, and initiate guest sessions to other users accounts. Users can browse the folders in other users accounts to the extent that they have been granted the right to do so in previously acquired certificates. Additionally, the user can, via the interface, define realms within their account and manage the issuing and/or revocation of certificates for other users.

Applications of the present invention are not limited to Internet file sharing. Small hand held computers are commonly used to maintain contact lists, just as cellular phones have memory in which to store commonly dialed numbers. However, data entry directly into these devices is quite difficult and laborious. Editing of a contact list file for a small hand held computer can be carried out by exporting the file to a desktop computer, entering the changes, and then saving the file to the hand held computer, but this is a cumbersome process in its own right.

The present invention makes it possible to maintain contact files of all kinds without the need to manually reenter duplicate data into other devices, and with the capability to make immediately available any changes or updates of the data made by other users. For example, a user upon purchasing a cell phone maintains as files on a network according to the invention both a contacts list and contact information. The contact information contains the user's current phone number. The contacts list contains names and phone numbers that the user has saved. However, such names and numbers need not be saved as is, but instead as a series of links to the contact information of other users, stored in a folder in an accessible realm in those users' own accounts. To obtain the number, the phone transmits a request to a program running on the network, which returns the current information stored for the person the user is calling and dials their current number, or returns their current number permitting the user to dial it. Any change in phone number which has occurred is retrieved and, indeed, the user may not even notice that a new number was dialed, or even be aware that the account of the person the user is calling may itself have migrated to another server.

As to contact information, when the user needs a new phone, and possibly a new phone number as well, the transition is easily accomplished since their user ID number (e.g., SecureGUID) remains the same. The new phone accesses the existing contact list stored on the server, not on the phone, so no manual re-entry of contact information is necessary. The new phone number is posted to the user's contact information folder. Other users with permission to access that folder will subsequently obtain the new number. The new number can be posted to a folder classified in a well-known realm (e.g., for all customers of the cellular provider or the staff of a particular company, in the manner of a telephone directory) or a privately defined realm (e.g., for family and friends chosen specifically by the user.) Since the same folder may be included in more than one realm, the user's contact information may be classified in several realms. Thus, the system of the invention can provide applications including self-updating corporate address books and self-correcting customer lists.

Contact information may include just phone number(s), in the case of a network created for telephone contacts only, or may include other contact data such as postal address. The user then can then make this information available to creditors, correspondents and the like, so that change of address data is immediately available to each entity having access to the user's contact information folder, without going through the arduous process of manually notifying contacts of an address change.

The invention provides an integral system and method to create a center-less network of private resources. Such resources may be securely exposed by a user to certain other users, irrespective of where their respective accounts are hosted. These users may switch service provider without loosing their permissions. These permissions, themselves delegable, grant access to resources that may be distributed across multiple accounts across the network. While the above description contains many specifications, these should not be construed as limitations on the scope of the invention, but rather as exemplification of one of the preferred embodiments thereof Within the scope of the description itself, many implementation alternatives exist. For example, whilst the preferred embodiment makes use of HTTP and SOAP to enable the remote invocation of methods, it may equally use object request broker technologies such as RMI and CORBA, or remote procedure call methods such as XML-RPC. Beyond the scope of the detailed description, many other variations of the application of the security model are also possible. For example, the preferred embodiment is concerned with the management of access to static files structured in a hierarchy of folders. The invention could equally be applied to the management of access to other resources, for example application objects, network services, or dynamic content. Accordingly, the scope of the invention should be determined not by the embodiment illustrated, but by the appended claims and their legal equivalents.

The invention claimed is:

1. A method for maintaining contact information for a number of users having accounts on a network, the network comprising a number of client telephones that use stored contact information including telephone numbers for dialing, a server on which the user accounts are hosted, and means permitting data communication between the server and the client telephones, comprising the steps of:

maintaining on the server for each user account current contact information for the associated user;

maintaining on the server a contact list of telephone numbers which that user has selected, which contact list can be accessed and dialed by the client telephone used by that user, and associating a user account with a new telephone so that the new telephone can dial the contact telephone numbers for that user account.

2. The method of claim 1, wherein the telephones are wireless portable telephones.

3. The method of claim 1, further comprising associating a user account with a new telephone number as well as a new telephone.

4. A method for maintaining contact information for a number of users having accounts on a network, the network comprising a number of client wireless portable telephones that use stored contact information including telephone numbers for dialing, a server on which the user accounts are hosted, and means permitting data communication between the server and the client wireless portable telephones, comprising the steps of:

maintaining on the server for each user account current contact information for the associated user;

maintaining on the server a contact list of telephone numbers which that user has selected, which contact list can be accessed by the client telephone used by that user; and associating a user account with a new telephone so that the new telephone can dial the contact telephone numbers for that user account, wherein the current contact information for the associated user includes a user ID that remains the same when the user changes wireless portable telephones.

5. The method of claim 4, further comprising permitting a user account to grant another user account permission to access that user's contact information.

6. The method of claim 4, further comprising running a program which receives a request for a contact telephone number through the network from a client telephone, which program returns the current information stored for the requested contact to the client telephone.

7. The method of claim 6, wherein the program is running on the server on which data containing the user account information is stored.

8. The method of claim 4, further comprising associating a user account with a new telephone number as well as a new telephone.

9. The method of claim 4, wherein the user telephone accesses the contact list in order to dial a number stored on the contact list.

* * * * *